(12) United States Patent
Pabst

(10) Patent No.: US 8,520,565 B2
(45) Date of Patent: Aug. 27, 2013

(54) FULL DUPLEX NETWORK RADIO BRIDGE WITH LOW LATENCY AND HIGH THROUGHPUT

(76) Inventor: William George Pabst, Sunnyvale, CA (US)

( * ) Notice: Subject to any disclaimer, the term of this patent is extended or adjusted under 35 U.S.C. 154(b) by 297 days.

(21) Appl. No.: 12/800,075

(22) Filed: May 7, 2010

(65) Prior Publication Data

US 2010/0254317 A1  Oct. 7, 2010

Related U.S. Application Data

(62) Division of application No. 11/890,165, filed on Aug. 3, 2007, now Pat. No. 7,751,350.

(51) Int. Cl.
*H04B 3/30* (2006.01)

(52) U.S. Cl.
USPC .......................................... 370/285; 370/328

(58) Field of Classification Search
USPC .................................. 370/365, 285
See application file for complete search history.

(56) References Cited

U.S. PATENT DOCUMENTS

| | | | |
|---|---|---|---|
| 5,121,382 A * | 6/1992 | Yang et al. | 370/250 |
| 6,023,563 A * | 2/2000 | Shani | 709/249 |
| 6,192,054 B1 * | 2/2001 | Chan et al. | 370/452 |
| 6,502,189 B1 * | 12/2002 | Westby | 713/1 |
| 6,857,027 B1 * | 2/2005 | Lindeborg et al. | 709/239 |
| 2003/0123492 A1 * | 7/2003 | Locke | 370/537 |
| 2007/0086361 A1 * | 4/2007 | Allan et al. | 370/254 |
| 2007/0118595 A1 * | 5/2007 | Jain et al. | 709/203 |
| 2008/0050117 A1 * | 2/2008 | Koley | 398/49 |
| 2009/0037607 A1 * | 2/2009 | Farinacci et al. | 709/249 |
| 2012/0151048 A1 * | 6/2012 | Kitazawa | 709/224 |

* cited by examiner

*Primary Examiner* — Joseph Avellino
*Assistant Examiner* — Tsung Wu
(74) *Attorney, Agent, or Firm* — Ronald C. Fish

(57) ABSTRACT

A full duplex radio bridge using two transceivers coupled to a first packet network, one for transmitting data toward another radio bridge coupled to a second packet network, and the other for receiving data transmitted from the first packet network toward said second packet network by a transceiver of the other radio bridge. Each radio bridge is coupled to its packet network through one network port whose transmit data path is coupled to one of the transceivers, and whose receive data path is coupled to receive data from the other transceiver. An inner loop and outer loop is used. Management packets are routed to the various transceivers using the inner loop and outer loop by routing and filtering functions. Payload packets are transmitted from one packet network to the other using only the outer loop.

4 Claims, 19 Drawing Sheets

PRIOR ART FULL DUPLEX RADIO BRIDGE

A SEQUENCE OF NORMAL LINK
PULSES, USED BY 10BASE-T
DEVICES TO ESTABLISH LINK
INTEGRITY

THREE TRAINS OF FAST LINK PULSES,
USED BY AUTONEGOTIATING
DEVICES TO DECLARE THEIR
CAPABILITIES

HOW A LINK CODE WORD (A 16 BIT
WORD) IS ENCODED IN A FAST LINK
PULSE BURST

DC - TO - DC ON RADIO BOARD

FULL DUPLEX NETWORK RADIO BRIDGE WITH LOW LATENCY AND HIGH THROUGHPUT

This is a divisional application under 37 CFR 1.53(b) of U.S. patent application Ser. No. 11/890,165, filed Aug. 3, 2007 now U.S. Pat. No. 7,751,350.

BACKGROUND OF THE INVENTION

Networking of high speed data over lines owned by the phone companies or other entities is expensive. Some customers want to network high speed data and own their own infrastructure by sending the data line-of-sight by RF between antennas located at high points that are in line of sight of other antennas. This saves these customers quite a bit of money since they have no recurring fees, and the customers can manage and control their network infrastructure themselves. Since the costs are low, the return on investment is short.

DETAILED DESCRIPTION OF THE VARIOUS EMBODIMENTS

Prior art systems offered by Airaya and other companies such as Cisco, Proxim, Redline, etc. are all half duplex except for a full duplex product offered by Tranzio. Half duplex means that the radio transceivers on each end are limited such that only one end can transmit at any particular time. Half duplex limits the data rate because all the devices connected to the radio bridges are Ethernet devices which have full duplex capability which is wasted.

Figure 1:
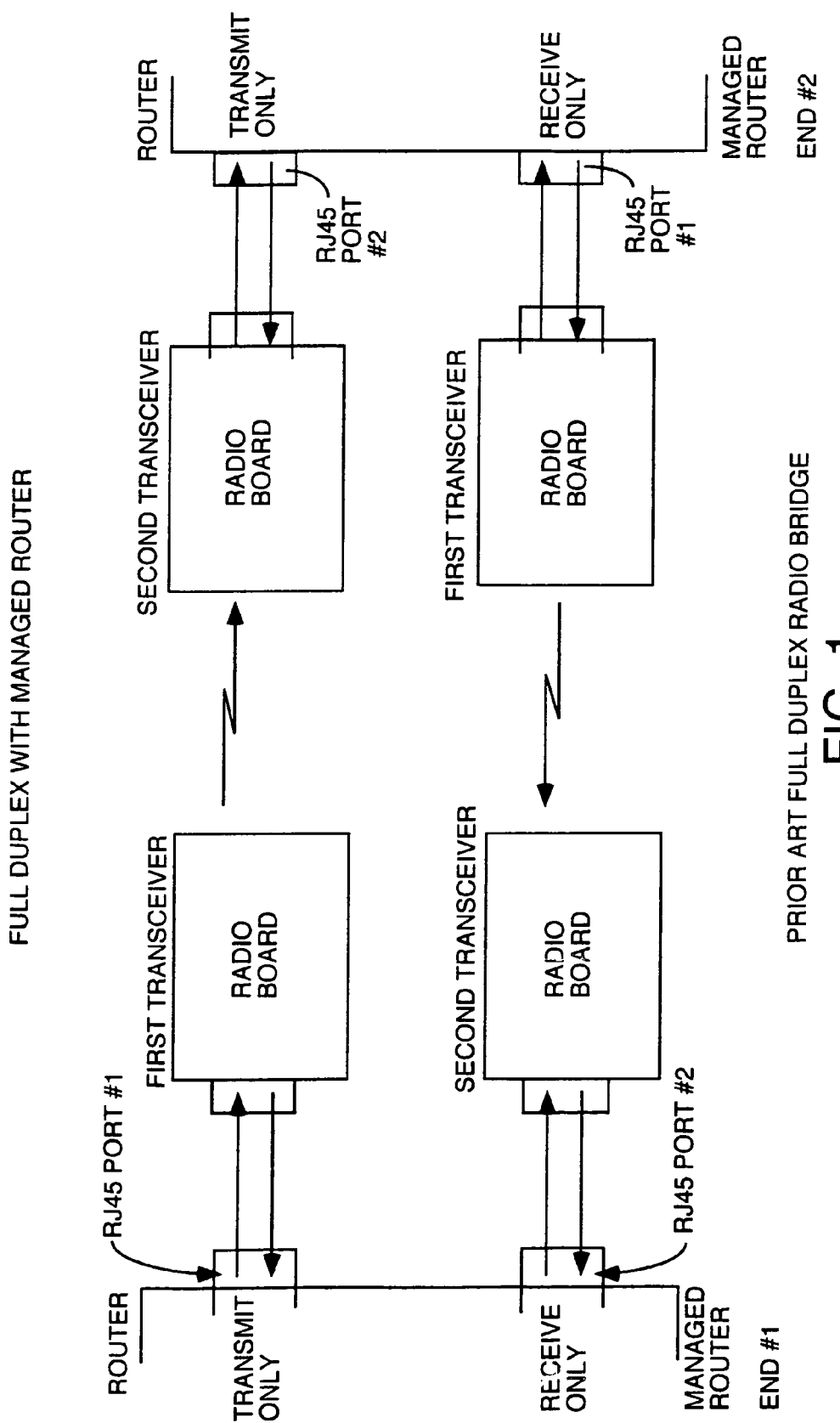
FIG. 1 is a block diagram of a prior art radio bridge system using two half duplex radio transceivers at each end, each coupled to a managed router.

Some attempts at full duplex have been made where two separate radio links are used and a commercial level gateway approximately $10,000 to $30,000 for these commercial level gateways is used at each end of the radio bridge. Such a prior art system is shown in FIG. 1. Let's call the two ends end #1 and end #2. At end #1 there is a first half duplex downstream radio board having a half duplex transceiver the first transceiver which is transmitting data downstream. This radio bridge has an RJ45 Ethernet port which is coupled to a first RJ45 port #1 of a commercial level router which is programmed to logically separate the upstream and downstream paths. At end #1 there is also a second half duplex upstream radio board having a transceiver the second transceiver which is receiving data from end #2 simultaneously with the transmission downstream from end #1 by the first transceiver. The second transceiver is coupled to RJ45 port #2 of the end #1 commercial level gateway.

An identical arrangement of commercial level gateway and two half duplex radio transceivers exists at end #2.

The commercial level gateway couples the radio transceivers to the company's internal network. The commercial level gateway takes outgoing packets from the internal network and sends to the transmitting radio link the first transceiver out RJ45 port #1. The commercial level gateway also receives incoming packets from the upstream half duplex radio link provided by the second transceiver at RJ45 port #2 and routes them to the internal network.

To avoid a loop, the commercial level gateway is programmed to logically separate the two data paths so that RJ45 port #1 is only used to send packets to the other side and RJ45 port #2 is only used to receive packets from the other side. Not just any hub, switch or router can make this logical separation. It takes a gateway which has the software and hardware which can be configured to act this way and not every hub, switch or router is. Most are not. Most hub, switches and routers have the characteristic that when a broadcast Ethernet packet is received at any one of its RJ45 ports, that packet is broadcast out all the other RJ45 ports of the device. Broadcast Ethernet packets are designed to find a device which owns a specific IP address and have a MAC address which has a destination MAC address which is all Fs hex. The physical layer circuitry sees this MAC address and sends the broadcast packets up to the level 2 protocols and from there it goes to the level 3 routing protocols to determine if the device owns the IP address specified in the broadcast packet.

Figure 2:
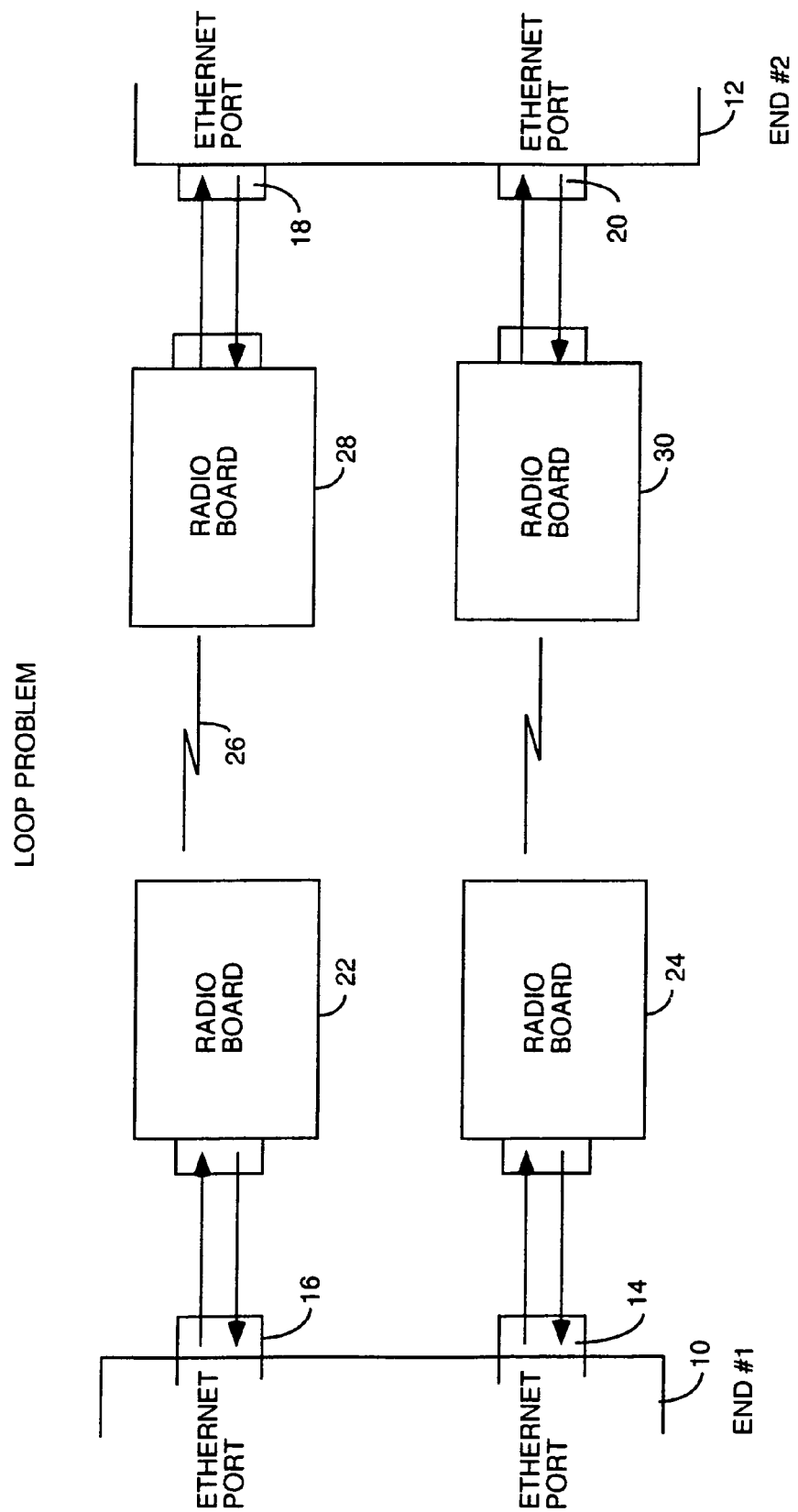
FIG. 2 is a block diagram of illustrating the loop problem.

FIG. 2 is a block diagram illustrating the loop problem which would occur if a hub or switch or router not having the characteristics of the commercial level gateway were substituted for the commercial level gateway. In FIG. 2, blocks 10 and 12 each represents a regular hub, switch or router hereafter just router with multiple RJ45 Ethernet ports such as 14, 16, 18 and 20. Each of the routers 10 and 12 have the typical characteristic that if a Ethernet broadcast packet arrives at one port, the same packet will be broadcast out every other port. This is done so that devices coupled to those ports can send the broadcast packets up to their level 3 or higher protocol layers to determine if that devices owns the IP address the device which sent the broadcast packet is looking for. Thus, if just any hub, switch or router having this broadcast characteristic were to be substituted for the commercial level gateway, a loop condition would result which would cause the network to fail whenever a broadcast packet arrived.

An example will illustrate this failure mechanism. In FIG. 2, router 10 has two separate RJ45 ports 14 and 16 each coupled to a different half duplex radio transceiver 22 and 24. Transceiver 22 takes digital data received from port 16 in Ethernet packets and modulates that data onto an RF carrier signal 26 which is transmitted downstream to another radio transceiver 28 operating half duplex. Transceiver 28 converts the RF signal back into Ethernet packets and sends them to port 18 of router 12. A similar process happens for upstream Ethernet packets sent from port 20 of router 12 to port 14 of router 10 via two half duplex radio transceivers 30 and 24. If routers 10 and 12 are normal broadcast routers coupled to the two half duplex radio transceiver's RJ45 ports, whenever a broadcast packet were received at RJ45 port #2 14 from end #2, it would be sent out RJ45 port #1 16 and sent to port 18 of router 12 at end #2. The router 12 coupled to the two half duplex radio links 28 and 30 at end #2 would then receive the broadcast packet from the radio link coupled to RJ45 port #2 18 and send it back out on RJ45 port #1 20 coupled to the upstream radio transceiver 30 and end #2 which would send it back to end #1. The system would then start chasing its own tail and collapse because no payload data could be sent.

The prior art structure which solves this problem is depicted in FIG. 1 and uses a commercial level gateway or managed router. The disadvantage of the prior art structure which solves this loop problem is that a commercial level gateway or managed router is needed. These are expensive and cause latency in the system. Other worker in the art have designed custom, microprocessor controlled PCBs with three Ethernet connections to mimic the same functionality of the managed router: one RJ45 port only transmits, one RJ45 only receives and the third RJ45 is connected to the network or upstream data source. These prior art systems suffer the same problems as the managed router prior art systems: extra cost and latency injected into the system while the microprocessor on the PC board examines each packet to determine how to route it, stores the packet in a queue in memory and transmits it later.

Figure 3:
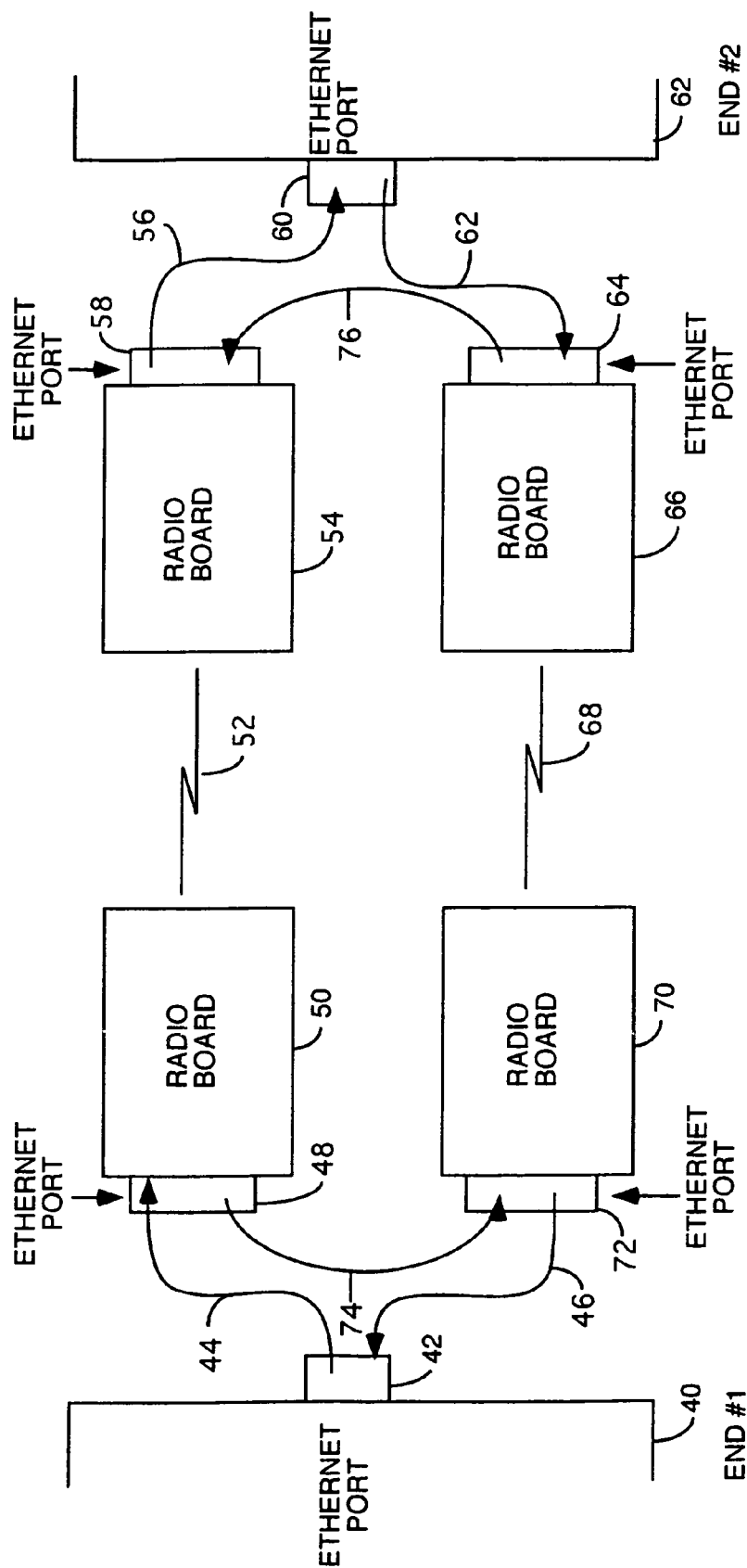
FIG. 3 is a block diagram of one embodiment of an Ethernet radio bridge which solves the loop problem and which does not require either a managed hub or commercial level router to solve this problem.

FIG. 3 is a block diagram of one embodiment within the genus of the invention of an Ethernet radio bridge which solves the loop problem and which does not require either a managed hub or commercial level router to solve this problem. The idea of all the embodiments disclosed herein is to send payload data packets from one packet network to another over a radio frequency bridge without suffering from the loop problem and to allow each radio transceiver to be managed from anywhere by using an inner loop for management packets. Payload data packets are any type of Ethernet packet that has been originated on one of the packet switched networks coupled to a radio bridge which is to be sent to a device on another packet switched network coupled to another radio bridge which is linked to the first radio bridge by an RF link. Management packets are defined for purposes of this specification as either broadcast packets where the first 6 bytes of the destination MAC address are all hex F's or unicast packets which have a destination MAC address which belongs to one of the circuits in the transceivers of the radio bridges. Multicast packets also exist which are supersets of broadcast packet, but they are not relevant to the invention.

In FIG. 3, at end #1, any conventional Ethernet network element such as a hub, switch, router or computer 40 has an RJ45 Ethernet port 42 at which Ethernet packets are both sent and received. Every Ethernet RJ45 port and it mating connector has four wires, two for transmit and two for receive. The two transmit wires are represented by line 44. The two receive wires are represented by line 46.

The transmit wires 44 are connected to the receive wires of an Ethernet port 48 of a half duplex radio transceiver 50 at end #1. This radio transceiver converts the digital data of the Ethernet packets into a radio frequency signal 52 which is transmitted to another half duplex radio transceiver at end #2. Transceiver 54 demodulates the RF carrier signal, recovers the data and packetizes it in Ethernet packets, and outputs the recovered Ethernet packets from the two transmit wires 56 of an RJ45 Ethernet port 58. The two transmit wires 56 of RJ45 port 58 at end #2 are coupled to the two receive wires of Ethernet port 60 of any Ethernet component 62. This Ethernet component can be any switch, router, hub, computer, etc. and has no special requirements like Ethernet component 40 at end #1 has no special requirements. The Ethernet packets received via port 60 are processed normally. If any of the packets are broadcast packets, they are broadcast out all other Ethernet ports of the device 62 but not out port 60 because, by definition, no Ethernet component transmits a broadcast packet back out the same port upon which it was received.

Upstream packets to be sent from end #2 to end #1 are output on two transmit wires 62 from port 60 and are received at Ethernet port 64 of a half duplex radio transceiver 66. There, they are converted to RF signals 68 and transmitted to a half duplex radio transceiver 70 where the data is recovered, packetized and output on transmit wires 46 of Ethernet port 72. The transmit wires 46 are coupled to the receive wires of Ethernet port 42 and the Ethernet packets are processed normally by Ethernet component 40. Again, if any of the packets is a broadcast packet, the Ethernet component 40 will broadcast them out its other Ethernet ports, but not port 42 thereby solving the looping problem.

The structure shown in FIG. 3 even without the local loops 74 and 76 which will be explained more below solves the looping problem even if the devices 40 and 62 are not Ethernet devices but had a broadcast packet and characteristic like Ethernet where broadcast packets received at one port of a switch, router or hub are broadcast out all the other ports. What solves the looping problem is the connection of one half duplex radio bridge 50 to the two transmit wires of port 42 and the other half duplex radio bridge 70 to the two receive wires of the port 42. This is true regardless of whether port 42 is an Ethernet port or some other type of port. The structure of FIG. 3 solves the problem of enabling full duplex communication using two radio bridges 3 even without the local loops 74 and 76 even in other protocols such as RS232 because the transmit wires and the receive wires of a single port are connected to two independently operating half duplex radio bridges.

The local loop connections 74 and 76 are necessary in Ethernet applications of the invention to enable the negotiation process to operate properly. In Ethernet, when two Ethernet devices are coupled together, the devices start a negotiation to determine what each device is capable of and what the parameters of the Ethernet link will be. The radio board network connection 44 is an Unshielded Twisted Pair UTP. This pair is used to communicate with the Ethernet network connection at port 42. Using this UTP connection, the two devices 40 and 50, perform a negotiation to agree on the maximum data rate and operational mode, e.g. 10 Mb half duplex, 100 Mb full duplex, etc. The Ethernet 10baseT or 100BaseT, 1000BaseT etc. standard requires that both ends be connected to perform an autonegotiation and agree to a link negotiation result before any data is transferred between the devices. If the negotiation does not occur, the link between the two devices is not established, and no data can be transferred.

Autonegotiation formerly NWay is an Ethernet procedure by which two connected devices choose common transmission parameters, such as speed and duplex mode. In this process, the connected devices first share their capabilities as for these parameters and then choose the fastest transmission mode they both support.

In the OSI model, autonegotiation resides in the physical layer. It was originally defined in the IEEE standard 802.3u in 1995. It was placed in the fast Ethernet part of the standard but is also backwards compatible to 10BASE-T. However, its implementation was optional, and a part of the specification was open to interpretation. The debatable portions of the autonegotiation specifications were eliminated by the 1998 version of IEEE 802.3. In 1999, the negotiation protocol was significantly extended by IEEE 802.3ab, which specified the protocol for Gigabit Ethernet, making autonegotiation mandatory for Gigabit Ethernet operation.

Autonegotiation can be used by devices that are capable of different transmission rates such as 10 Mbit/s and 100 Mbit/s, different duplex modes half duplex and full duplex and/or different standards at the same speed though in practice only one standard at each speed is widely supported. Every device starts the negotiation by declaring its technology abilities, that is, its possible modes of operation. The two devices then choose the best possible mode of operation that are shared by the two devices, where higher speed 100 Mbit/s is preferred over lower speed 10 Mbit/s, and full duplex is preferred over half duplex at the same speed.

Parallel detection is used when a device that is capable of autonegotiation is connected to one that is not such as 10BaseT. This happens if the other device does not support autonegotiation or autonegotiation is disabled via software. In this condition, the device that is capable of autonegotiation can determine the speed of the other device, and choose for itself the same speed. This procedure cannot determine the presence of full duplex, so half duplex is always assumed.

The radio boards shown in FIG. 3 are capable of autonegotiation and it is required for the embodiments disclosed herein that the devices to which the radio boards are connected also be capable of autonegotiation. Autonegotiation is required by all embodiments within the teachings of the invention because the least common denominator standard for 10 BaseT devices not capable of autonegotiation is only half duplex and this defeats the purpose of the invention to implement full duplex.

The standard for 1000BASE-TX requires autonegotiation to be always present and enabled. Other than speed and duplex mode, autonegotiation is used to communicate the port type single port or multiport and the master-slave parameters whether it is manually configured or not, whether the device is master or slave if this is the case, and the master-slave seed bit otherwise.

Figure 4:
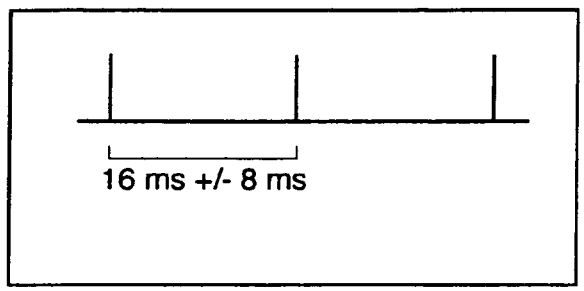
FIG. 4 shows a sequence of normal link pulses; used by 10BaseT devices to establish link integrity.

A sequence of normal link pulses, used by 10BASE-T devices to establish link integrity. FIG. 4 shows a sequence of normal link pulses, used by 10BaseT devices to establish link integrity.

Autonegotiation is based on pulses similar to those used by 10BASE-T devices to detect the presence of a connection to another device. These pulses are sent by a device when it is not sending or receiving any data. They are unipolar positive-only electrical pulses of a duration of 100 ns, generated at intervals of 16 ms with a tolerance of 8 ms. These pulses were called link integrity test LIT pulses in the 10BASE-T terminology, and are referred to as normal link pulses NLP in the autonegotiation specification.

A device detects the failure of the link which can be due either to a failure of the transmission medium or of the other device if neither a packet nor one of the pulses are received for 50-150 ms. The presence of a valid link is signaled by the receipt of a valid packet or two consecutive link integrity test pulses. For this to work, devices send link integrity test pulses even when not receiving any.

Figure 5:
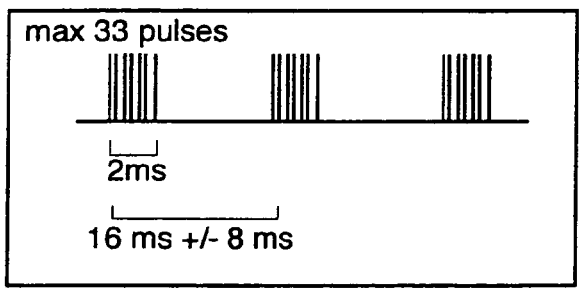
FIG. 5 shows three trains of fast link pulses used by auto-negotiating devices to declare their capabilities.
Figure 6:
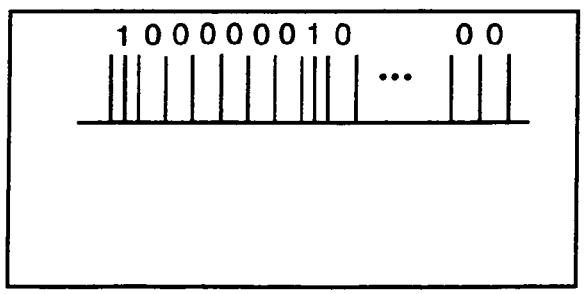
FIG. 6 shows how a link code word a 16 bit word is encoded in a fast link pulse burst.

Three trains of fast link pulses, used by autonegotiating devices to declare their capabilities. FIG. 5 shows and example of three trains of fast link pulses used by an autonegotiating device to declare its capabilities. These pulses used as part of the autonegotiating process are still unipolar, positive-only, and of the duration of 100 ns, but each one is replaced by a train of at most 33 pulses. Each such train is called a fast link pulse FLP burst. The time interval between the start of each burst is the same as the distance between normal link pulses, that is, 16 ms with a tolerance of 8 ms.

The fast link pulse burst is made as follows: there are 17 pulses at distance 125 microseconds with tolerance of 14 microseconds. In the middle between each set of two consecutive pulses, another pulse may or may not be present. The presence of a pulse represents a logical 1, the absence a logical 0. As a result, every burst represents a logical word of 16 bits. This word is called a link code word LCW. The 17 pulses are always present and are used as a clock, while the 16 pulses may or may not be present and represent the actual information that is transmitted.

Every fast link pulse burst transmits a word of 16 bits known as a link code word. The first such word is known as a base link code word, and its bits are used as follows:

0-4: selector field: it indicates which standard is used between IEEE 802.3 and IEEE 802.9;

5-12: technology ability field: this is a sequence of bits that encode the possible modes of operations among the 100BASE-T and 10BASE-T modes;

13: remote fault: this is set to one when the device is detecting a link failure;

14: acknowledgment: the device sets this to one to indicate the correct reception of the base link code word from the other party; this is detected by the reception of at least three identical base code words;

15: next page: this bit is used to indicate the intention of sending other link code words after the base link code word;

The technology ability field is composed of eight bits. For IEEE 802.3, these are as follows:
  bit 0: device supports 10BASE-T
  bit 1: device supports 10BASE-T in full duplex
  bit 2: device supports 100BASE-TX
  bit 3: device supports 100BASE-TX in full duplex
  bit 4: device supports 100BASE-T4
  bit 5: pause
  bit 6: asymmetric pause for full duplex
  bit 7: reserved The acknowledgement bit is used to signal the correct reception of the base code word. This corresponds to having received three identical copies of the base code word. Upon receiving these three identical copies, the device sends a link code word with the acknowledge bit set to one from six times to eight times.

The link code words are also called pages. The base link code word is therefore called a base page. The next page bit of the base page is 1 when the device intends to send other pages, which can be used to communicate other abilities. These additional pages are sent only if both devices have sent base pages with a next page bit set to 1. The additional pages are still encoded as link code words using 17 clock pulses and up to 16 bit pulses.

The problem with the connection setup in FIG. 3 absent the local loop is that the radio board 50 only receives base code words from device 40 but has no path to send link code words back to device 40 with the acknowledgment bit set. Neither device 40 nor device 50 will light its link light until the negotiation is successfully performed by reception of a base code word successfully three times and transmission of a link code word with the acknowledge bit set. Likewise, radio board 70 can send base code words to device 40, but cannot receive link code words directly from device 40. Some way to allow each of radio boards 50 and 70 and device 40 to both receive base code words and transmit link code words in order to successfully complete a negotiation and establish links on data paths 44 and 46.

To guarantee that this negotiation is performed and completes successfully, and a way to connect the transmit data and the receive data to two different UTP connections of the radio bridge devices, a new connection method was invented. The new device and network structure allows three UTP connection devices to all successfully carry out the autonegotiation even though none of the three devices can both send base code words and receive link code words from any one of the other devices. Specifically, the new device and connection topology allows each of the radio boards 50 and 70 to successfully autonegotiate with device 40 even though neither radio board 50 or 70 can both send base code words to and receive link code words from the device 40.

The three UTP connections at end #1 Ethernet ports are the network device 40 and each of the two radio bridge boards 50 and 70. A similar structure exists at end #2. By connecting the UTP1-tx to UTP2-rx two wire data path 44, UTP2-tx to UTP3-rx two wire data path 74, and UTP1-rx to UTP3-tx two wire data path 46, the necessary negotiation between the three devices is successful, allowing data to be sent in a ring between the devices.

Figure 7:
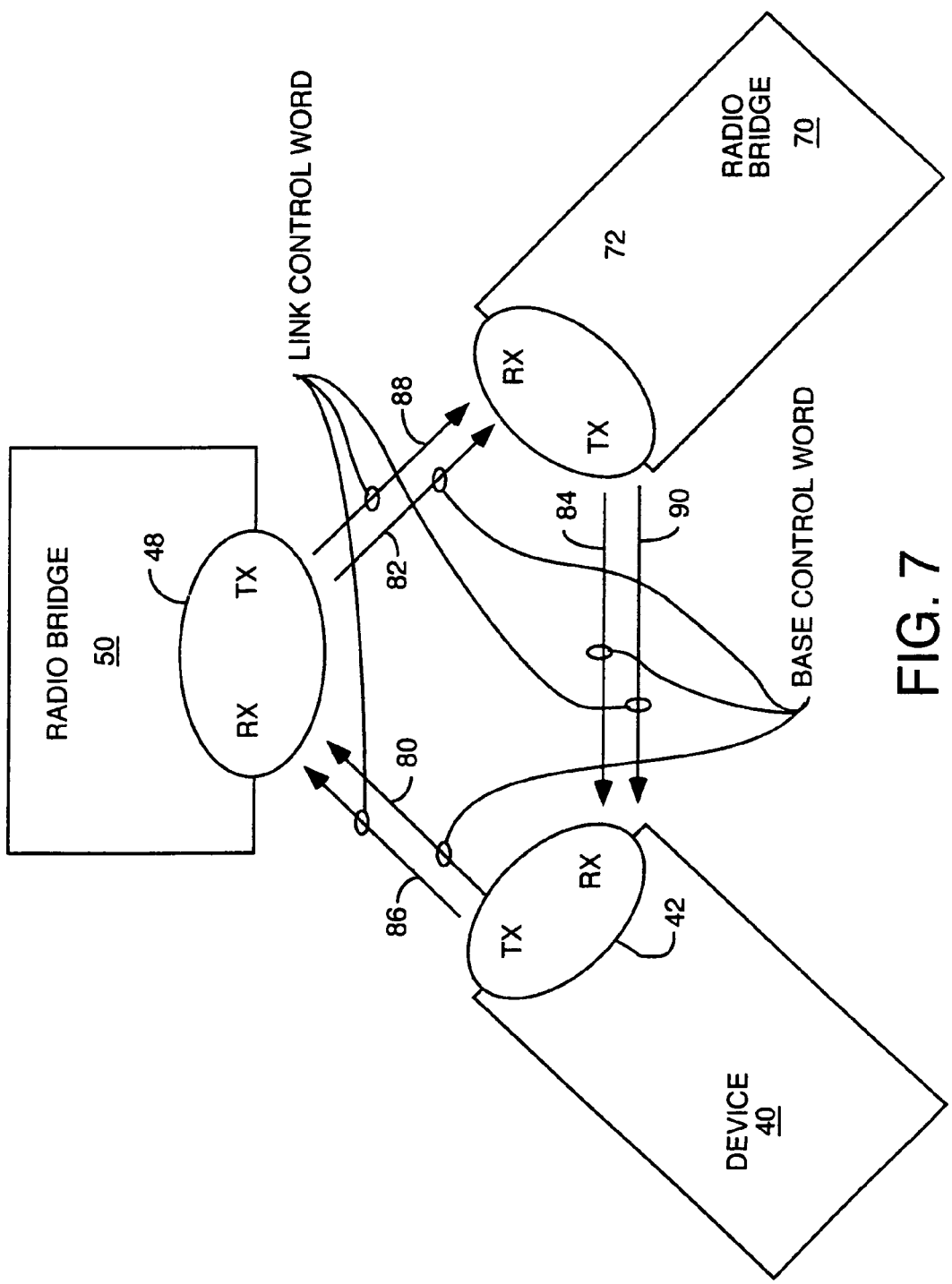
FIG. 7 shows the propagation of the Ethernet Base Control Word and Link Control Word over the inner loop to allow of each link to the radio transceivers even though the each radio transceiver's Ethernet link is unidirectional.

To understand this, refer to FIG. 7 which is a diagram of how the three devices 40, 50 and 70 send base code words and link code words to each other in a ring topology. Each device sends a base code word and gets a link code word and, as far as it is concerned, the negotiation is complete even though the link code word did not come from the device to which the base code word was sent. Specifically, in FIG. 7, device 40 sends a base code word represented by line 80 from the transmit wires of its port 42 at time 1. At the same time, radio board 50 sends a base code word represented by line 82 from the Tx wires of its port 48 to the Rx wires of port 72 of radio bridge 70, and radio bridge 70 sends a base control word line 84 from the Tx wires of its port 72 to the Rx wires of port 42 of device 40. Each device, after having received three copies of the base control word, sends a link control word at time two out its Tx wires of its respective ports. These link control words are represented by lines 86, 88 and 90. These link control words have their acknowledge bits set so when they are received by the device to which they are sent, that device thinks the link control word came from the device to which the base control word was sent, and the negotiation has been successfully completed.

The result of this connection method, provides a data path from the up stream network connection to one of radio bridge boards and from the second radio board back to the up stream network connection. The $3^{rd}$ connection between the Tx of one radio bridge board to the Rx of the other radio bridge board defined a new communications path between all the radio bridge devices, including the remote units. This new communications path is called the inner loop.

Inner Loop

The inner loop does not perform any data movement between the attached network devices. By making modifications to the existing bridging software, and the use of the inner loop, all external networking devices and other bridges, can communicate and perform configuration and management on any other radio bridge devices. With communications to any radio bridge, the network operator can configure the two radio links to function as required. This includes all available options defined in the Web management and Command Line Interpreter CLI defined by the operations manual of the prior art product made by the assignee of this invention.

Figure 8:
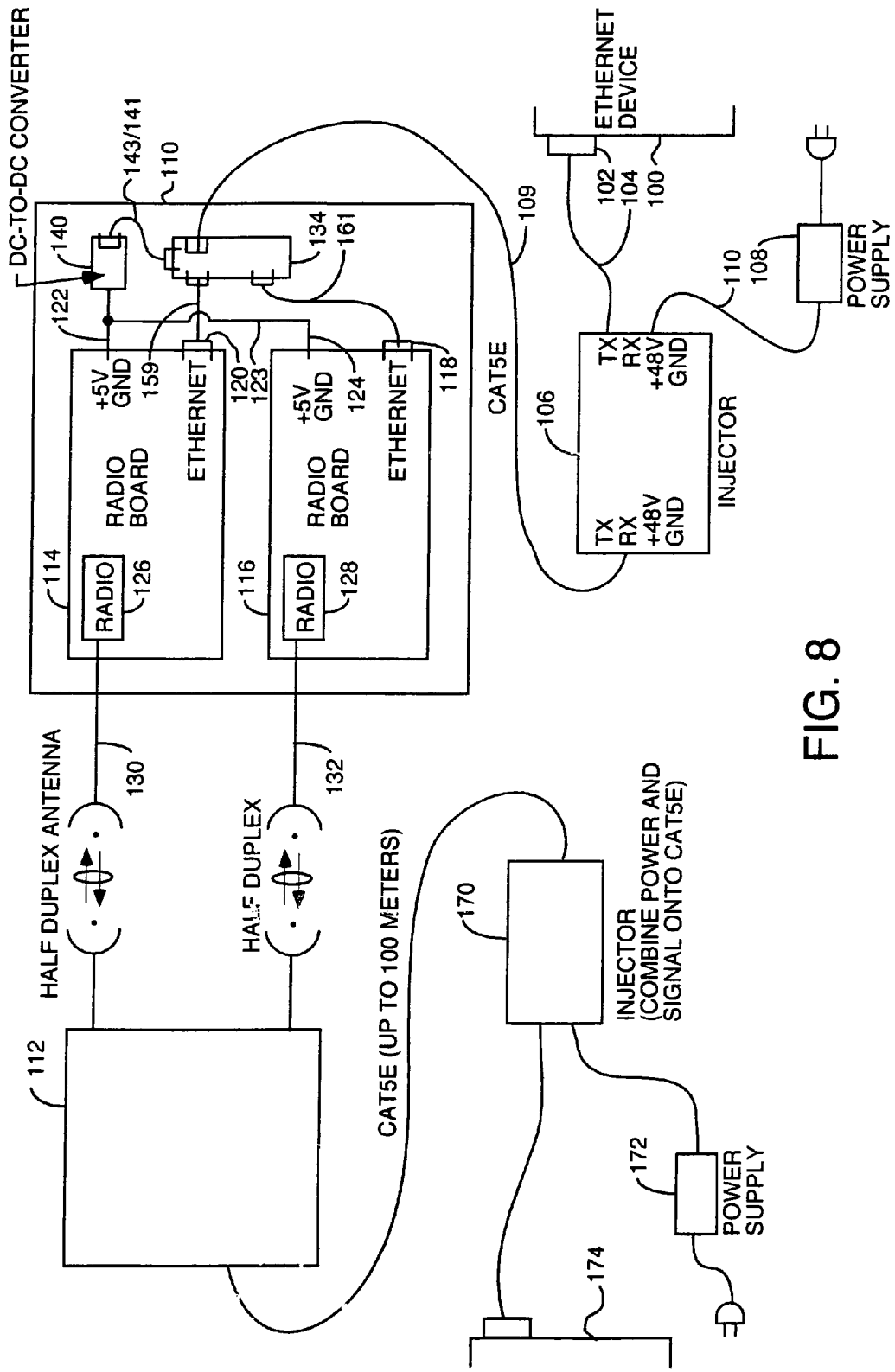
FIG. 8 shows a block diagram of an embodiment using a power injector to power the radio transceivers over the CAT5E wiring carrying the data up to the radio bridges.
Figure 15:
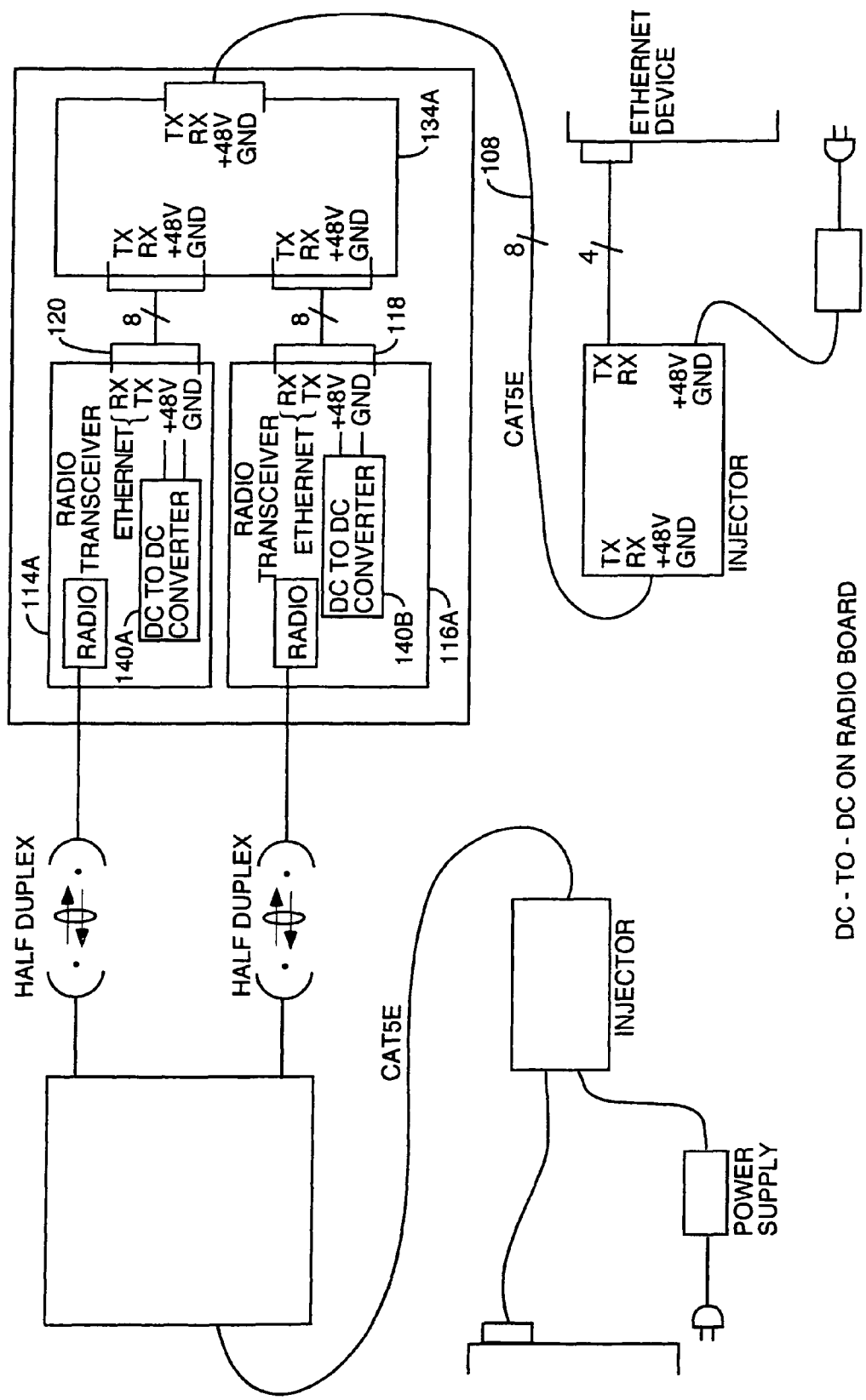
FIG. 15 is a block diagram of two full duplex radio bridges for a 10BaseT Ethernet network or 100BaseT Ethernet network where the DC-To-DC converter 140 in FIG. 8 has been integrated onto the radio transceiver boards 114A and 116A and the splitter 134A is modified such that, in addition to routing the transmit and receive data paths of CAT5 cable 109 to Ethernet ports 120 and 118, respectively, on the radio transceivers, it also routes the power and ground wires of CAT5 cable 109 to these ports 120 and 118 where they are coupled to the on-board DC-To-DC converters 140A and 140B. Splitter 134A also couples the inner loop data path of transceiver 114A to the inner loop data path of transceiver 116A.

Overall Block Diagram of an Example Embodiment Showing Actual Physical Partitioning of Circuitry FIG. 8 shows a block diagram of an embodiment of two full duplex radio bridges coupled to each other and to external single network ports, each radio bridge using a power injector to power the radio transceivers over the CAT5E wiring carrying the data up to the radio bridges. In the embodiment shown, the radio transceivers 114 and 116 are separate circuits from the splitter circuit 134 and the DC-To-DC converter 140 and the injector circuit 106. In alternative embodiments, all these circuits can be a single printed circuit board, and in other alternative embodiments, some combinations of the above listed circuits can be implemented on one or more circuit boards so long as the functionality described below is maintained. FIG. 15 is a block diagram of two full duplex radio bridges for a 10BaseT Ethernet network or 100BaseT Ethernet network where the DC-To-DC converter 140 in FIG. 8 has been integrated onto the radio transceiver boards 114A and 116A and the splitter 134A is modified such that, in addition to routing the transmit and receive data paths of CAT5 cable 109 to Ethernet ports 120 and 118, respectively, on the radio transceivers, it also routes the power and ground wires of CAT5 cable 109 to these ports 120 and 118 where they are coupled to the on-board DC-To-DC converters 140A and 140B.

In the embodiment shown in FIG. 18, block 100 is any Ethernet hub, bridge, router, switch, computer, etc. with an RJ45 Ethernet port 102. Line 104 represents a bidirectional Ethernet link carrying signals in both directions to and from port 102.

Injector 106 is coupled to a power supply 108 which is connected to wall AC and outputs a 48 volt DC signal on line 110. The injector 408 integrates this 48 volt DC signal onto both the DC lines of the 8 wire CAT5E cable 109 going from the injector up to the radio bridge 110 which is usually located on the roof of a building or somewhere high up to achieve line-of-sight communication with another radio bridge 112. CAT5E cables have 8 wires: two TX, two RX, two positive DC 48 volts; and two ground. In the claims, this CAT5E cable and any other Ethernet data path physical format with a transmit pair and a receive pair will be referred to as an Ethernet link. In the claims, a power over Ethernet link will be used to refer to an Ethernet link which also carries at least one wire for coupling to a +48 volts DC power supply and at least one wire for coupling to ground. Typically a power over Ethernet link will contain a pair of wires for coupling to a +48 VDC voltage supply, and a pair of wires for coupling to ground. CAT5E Ethernet cables contain four pairs: one transmit pair, one receive pair, one +48 VDC pair and one ground pair.

Figure 10:
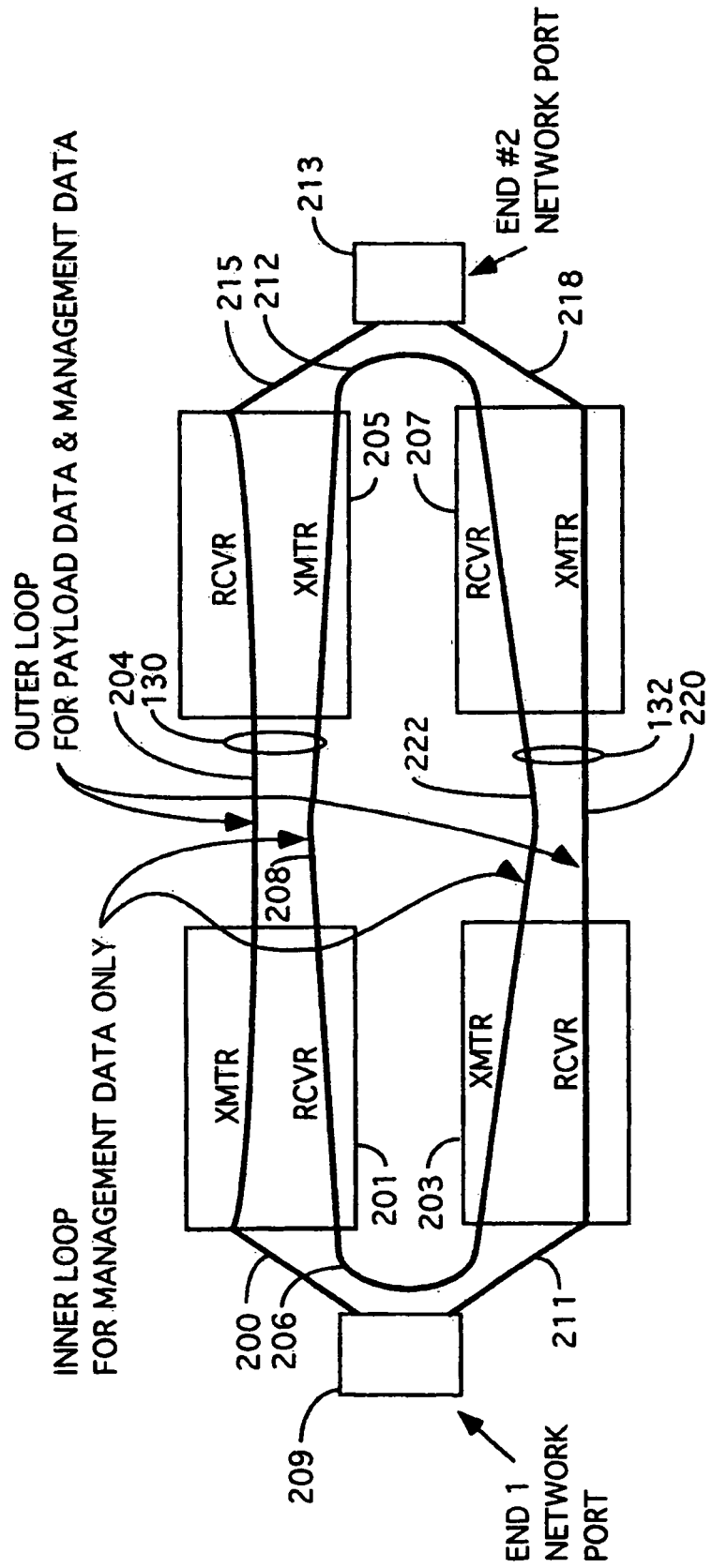
FIG. 10 is a diagram of the inner and outer loops and their corresponding ports in the pair of radio bridges.

Block 110 includes the two radio transceivers 114 and 116, each of which is a prior art radio transceiver having an Ethernet port 118 and 120, a DC input 122 and 124, a radio transceiver 126 and 128 which function to convert the incoming payload and management (outer loop and inner loop) digital data to modulated RF signals which are output at port 130 and receives incoming RF signals encoded with payload and management (outer loop and inner loop digital data packets) at port 132 and recovers the packets and routes them according to what type of packet each is and what the destination address of the packet is. In other words, the inner loop data path not only includes hardwired data paths 206 and 212 in FIG. 10 it also includes "logical" radio links 208 and 222. In the physical world, there is only one radio frequency link between each pair of transceivers at side 1 and side 2, and this physical radio frequency link in each direction carries both payload data packets and management data packets. In other words, FIG. 10 is an illustration of the logical data paths for both the inner and outer loop between each pair of transceivers, and there is no actual separate RF link for the inner loop data path 208 or the inner loop data path 222. Between the two radio bridges, both the outer loop and the inner loop data packets are transmitted on two single RF data paths, each at a different frequency (or using different code division multiplexing for each direction at the same frequency) each carrying payload data and management data in one direction only.

Each radio transceiver has a transmitter and a receiver, one of which is used to transmit or receive (but not both) payload data packets and one of which is used to transmit or receive but not both management data packets. To understand this, refer to FIG. 10. FIG. 10 illustrates both the outer loop data paths 204 and 220 which carry Ethernet payload data packets and management data packets, and inner loop data paths 208 and 222 which carry only management data packets and broadcast data packets. Each of transceivers 201, 203, 205 and 207 contains a transmitter and a receiver. The transmitter of transceiver 201 sends both payload and management packets as RF signals to the receiver of transceiver 205 on outer loop data path 204. Any management packets originating at end #2 either from a device coupled to the LAN coupled to port 213 or originating from one of the transceivers 203, 207 or 205 and addressed to transceiver 201 are transmitted by the transmitter of transceiver 205 in half duplex mode back on inner loop data path 208 to transceiver 201. The transmitter of transceiver 207 sends both payload and management data packets to transceiver 203 via outer loop data path 220. Any management or broadcast packet originating from any device coupled to the LAN coupled to port 209 or originating at any of transceivers 205, 201 or 203 and addressed to transceiver 207 are sent via the transmitter of transceiver 203 operating in half duplex mode to transceiver 207 over inner loop data path 222.

Inner loop path segments 206 and 212 carry the Base Control Word and Link Control Word pulses in non RF form. Inner loop path segments 208 and 222 carry inner loop management in the form of modulated RF signals generated by radio transceivers 201, 203, 205 and 207. Outer loop path segments 200, 215, 218 and 211 carry Ethernet payload data packets in non RF form, and outer loop path segments 204 and 220 carry Ethernet payload data packets in the form of RF signals modulated with the packet data generated by radio transceivers 201, 203, 205 and 207.

Block 110 also contains circuit 140 which is a DC-To-DC converter which is explained more below.

The circuitry on the left half of FIG. 8 is identical to the circuitry in the right half: Circuit 112 corresponds to circuit 110. Injector 170 corresponds to injector 106, and power supply 172 corresponds to power supply 108. Ethernet device 174 can be any Ethernet device.

Figure 9A:
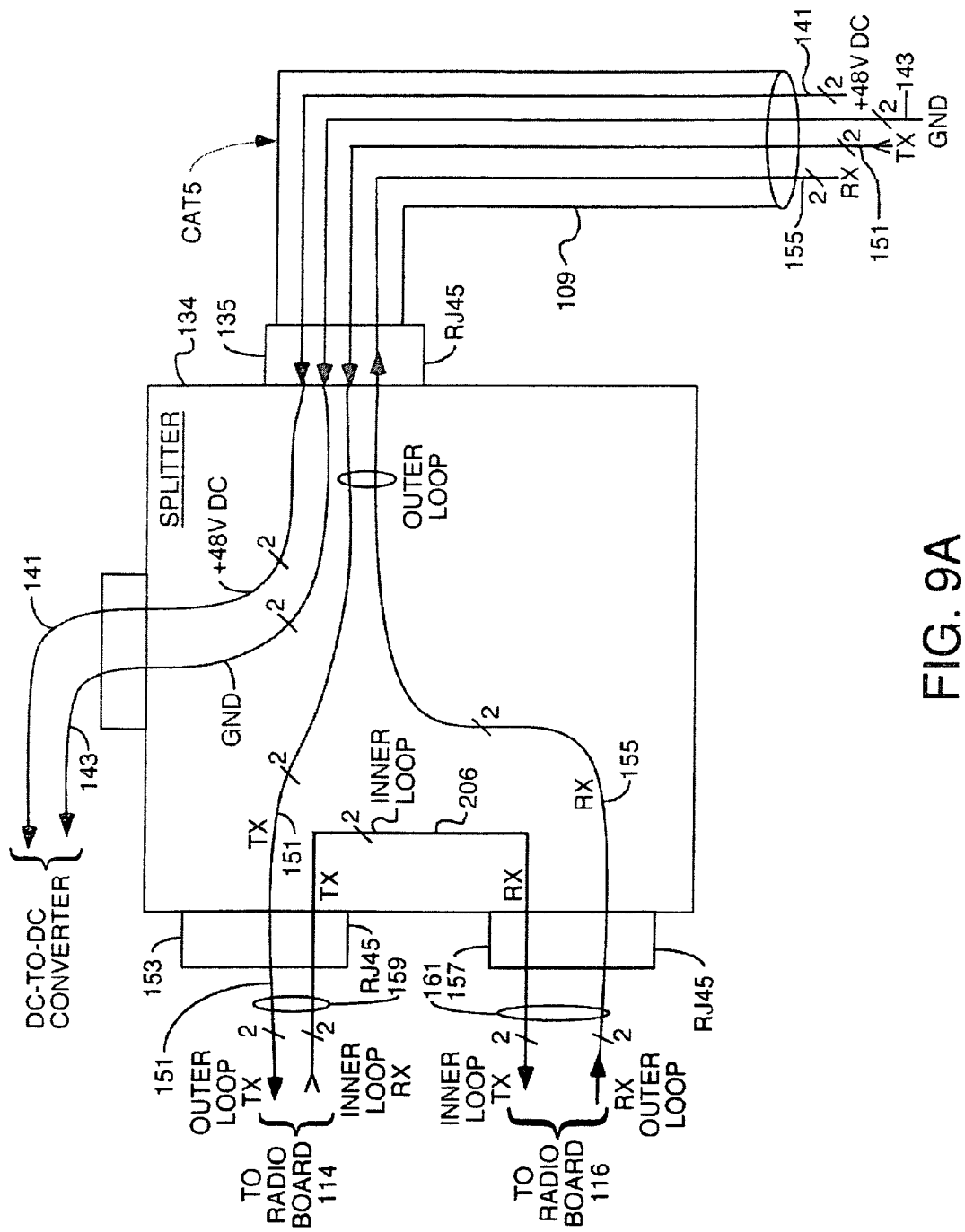
FIGS. 9A and 9B are diagrams of two different embodiments of data paths for transmit, receive in the splitter circuit 134 in FIG. 8. It is this circuit which separates the transmit and receive pairs of the Ethernet port coupled to the radio bridges and guides the data on each pair to and from two separate half duplex radio bridge transceivers. The circuits of FIGS. 9A and 9B perform the segregation of the transmit and receive signals in the CAT5E cable 109 which is necessary to make the embodiments work properly and avoid the loop condition. The circuit in FIG. 9A is for use in 10BaseT and 100BaseT Ethernet networks, and also functions to segregate out the power and ground connections for a DC-to-DC converter 140. The circuit in FIG. 9B is for use in 1000BaseT and 10000BaseT Ethernet networks, and does not segregate out power and ground wires because there are no power and ground wires in 1000BaseT and 10000BaseT CAT5 cables.
Figure 9B:
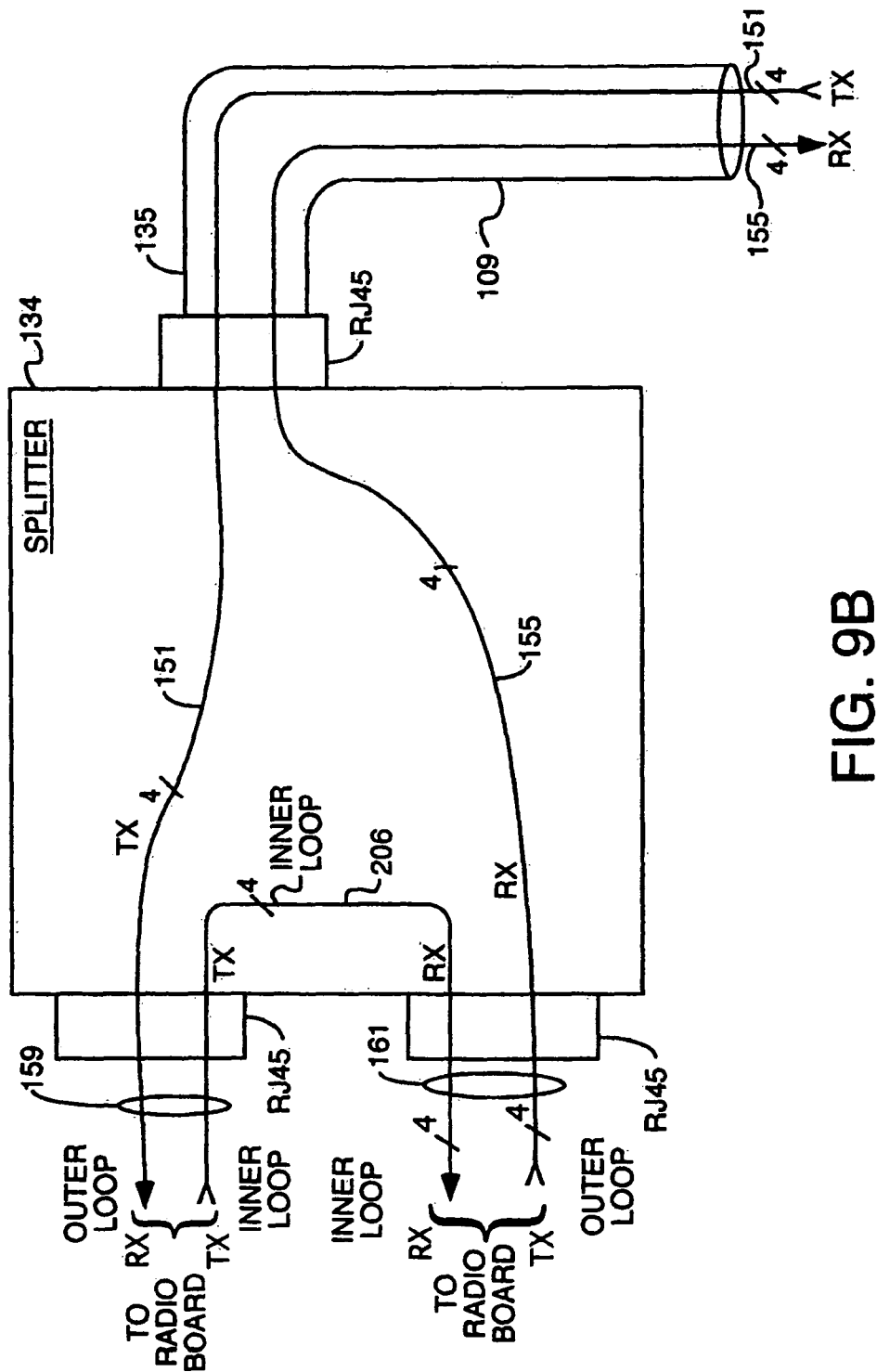

Returning to the consideration of block 134 in FIG. 8, there is circuitry inside block 134 shown in detail in FIGS. 9A and 9B which performs the segregation of the transmit and receive signals in the CAT5E cable 109 which is necessary to make the embodiments work properly and avoid the loop condition. The circuit in FIG. 9A is for use in 10BaseT and 100BaseT Ethernet networks, and also functions to segregate out the power and ground connections for a DC-to-DC converter 140. The circuit in FIG. 9B is for use in 1000BaseT and 10000BaseT Ethernet networks, and does not segregate out power and ground wires because there are no power and ground wires in 1000BaseT and 10000BaseT CAT5 cables. In general, the splitter circuits of FIGS. 9A and 9B are not limited to two wire or 4 wire transmit and receive pairs. Any number of wires for the transmit and receive pairs may be used in future standards. The teachings of the invention simply contemplate separation of the transmit and receive data paths of the Ethernet port to two separate radio transceivers and it does not matter how many wires are in each path or what kind of cable is used or whether there is or is not power and ground on the cable.

FIG. 9A shows a splitter with separate power and ground paths coupled to the power and ground paths of the incoming Ethernet cable. FIG. 9B shows a splitter without these power and ground paths for use in Ethernet networks where there is not power and ground on the incoming Ethernet cable. The teachings of the invention do not require any particular configuration for the power and ground supplies to the radio transceivers, i.e., the power can be on the incoming Ethernet cable or not and the DC-to-DC converters may be on the radio boards or off them and may be omitted altogether if the available DC power is already at the voltage required by the transceivers. For example, the transceivers may be on a roof top and a separate solar power and/or utility grid power supply may be co-located with the transceivers or located elsewhere and DC power of the proper voltage or some other voltage which may be converted to the proper voltage can be supplied to the transceivers without coming from the Ethernet link itself.

FIG. 9A is a diagram of the data paths for transmit, receive and power in the splitter circuit 134 in FIG. 8. It is this circuit which separates the transmit and receive pairs of the Ethernet port coupled to the radio bridges and guides the data on each pair to and from two separate half duplex radio bridge transceivers, and it couples inner loop traffic output at an inner loop packet data output port by the radio bridge 114 (the first transceiver) via data path 206 to an inner loop packet data input of radio bridge 116 (the second transceiver).

The DC-to-DC converter 140 receives two wires 141 of +48 VDC and two wires 143 of ground from the CAT5E pipe 109 coming from the injector 106. The DC-to-DC converter 140 is a DC-to-DC converter which converts the +48 VDC to two separate +5 VDC outputs 122 and 124 which power the radio transceivers 114 and 116. The TX wires 151 of the CAT5 pipe 109 couple to a set of transmit nodes of a first Ethernet port 203. These transmit nodes are electrically coupled by conductive traces 151 on circuit 134 to a set of transmit nodes on Ethernet port 153. These transmit nodes on Ethernet port 153 are coupled by a CAT5 jumper 159 or any jumper suitable for Ethernet data rates to radio transceiver 114. The RX wires 155 of CAT5 pipe 109 couple to a set of receive nodes in first Ethernet port 203. These receive nodes are coupled by a set of conductive traces 155 on circuit 134 to a set of receive nodes on Ethernet port 157. The receive nodes at Ethernet port 157 coupled by CAT5 jumper 161 to radio transceiver 116. The example shown in FIG. 9A uses two wires for each of the transmit and receive data paths 151 and 155 because the assumed Ethernet link is 10BaseT or 100BaseT. For gigabit Ethernet (1000BaseT standard), the transmit data path 151 is 4 wires and the receive data path 155 is 4 wires in 1000BaseT Ethernet, and there are no wires carrying +48 VDC or ground since all 8 wires of a CAT5 1000BaseT cable. An example of the circuit 134 for gigabit Ethernet applications is shown in FIG. 9B.

Each of the CAT5 jumpers 159 and 161 also use a two wire pair to send inner loop packets to or receive inner loop packets from one of the radio transceivers. Jumper 159 uses a pair to receive inner loop packets from radio board 114. Jumper 161 uses a pair to transmit inner loop packets to radio board 116.

Tx pair 151 and RX pair 155 of CAT5 pipe 109 coming from the network device to which the radio bridge is connected carry both inner loop management packets and outer loop payload packets. It is up to the software on the radio boards to examine each packet, determine if it is an inner loop packet or an outer loop packet and route it onto the inner or outer loop.

Operations to Route Management Packets onto Inner Loop and Payload Packets onto Outer Loop In order for the various embodiments disclosed herein to work properly, it is necessary for the radio bridges to be able to distinguish payload data packets from management packets at their various inputs and route those packets properly. Each radio bridge has two ports for the outer loop payload packet data path and two ports for the inner loop management packet data path. One of each of these pairs of ports is an input and the other is an output. There is software in the radio bridges at the various ports which monitor the incoming and outgoing packets to determine what kind of packets they are, i.e., management or payload. This software routes management packets onto the inner loop and routes payload data packets onto the outer loop.

Figure 11:
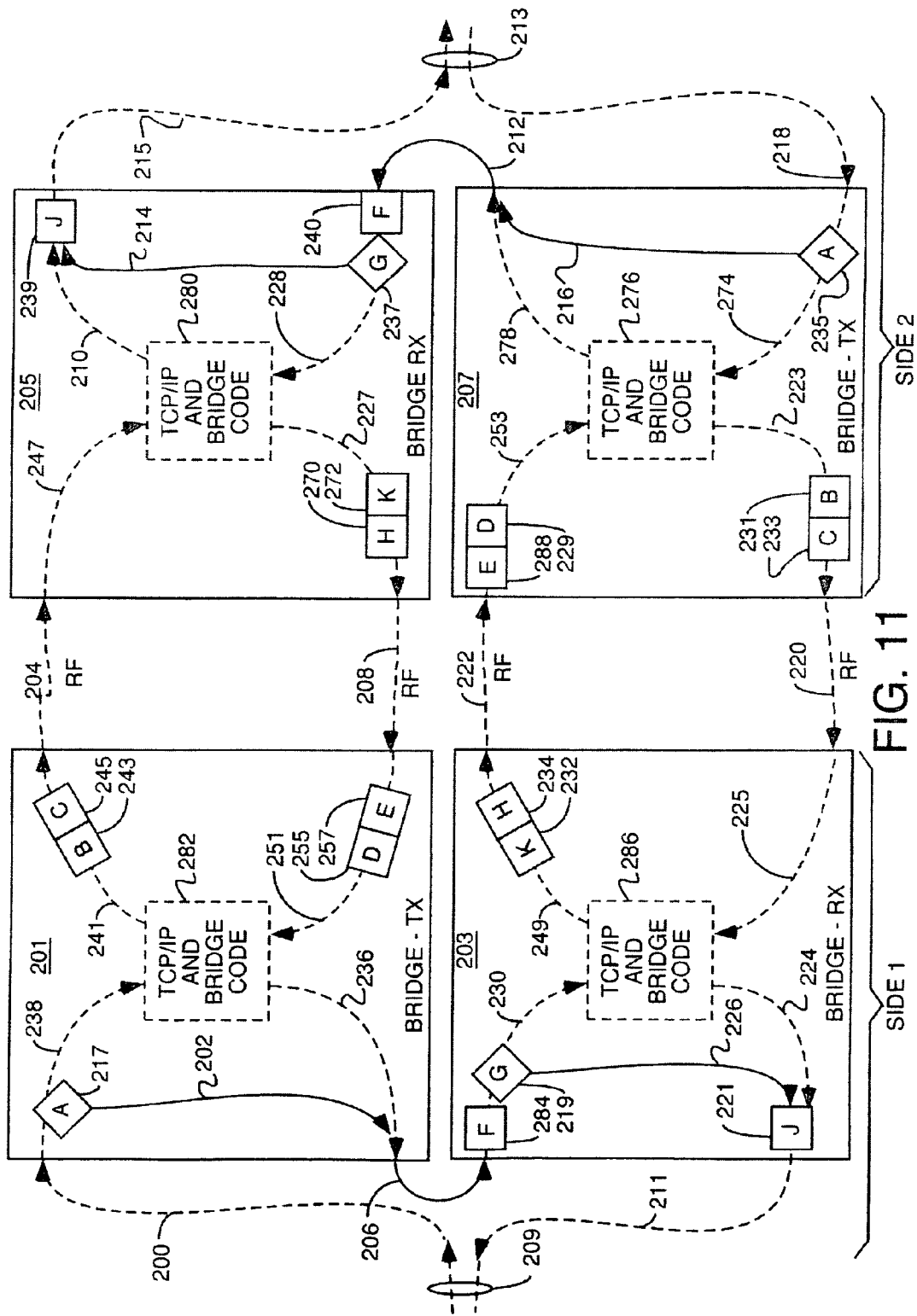
FIG. 11 is a diagram which illustrates the inner and outer loop data paths and the various software modules which make the inner loop/outer loop routing decisions.

FIG. 11 is a diagram which illustrates the inner and outer loop data paths and the various software modules which make the inner loop/outer loop routing decisions. The software modules are indicated by letters and the various inner loop and outer loop data paths are indicated by reference numbers.

The details of which software modules make which routing decisions and how the various inner and outer loop data paths are used to get management packets to the various circuits they control and how data packets get where they need to go follow.

There is a need to allow complete access to each bridge device on the network, by the network system administrator. The administrator needs to send management data packets to the four radio transceivers to manage and configure and use integrated tools to control them and best optimize the performance of the network. These options are made available in each bridge as server functions using the TCP/IP protocol stack. A bridge is one pair of radio transceivers at one side of the connection and their associate DC-to-DC converter and splitter circuits. This allows for the use of TCP and UDP protocols to send management packets as Ethernet packets over the outer loop payload data path to software in the bridge which routes these packets via the inner loop to the appropriate bridge circuit at side #1 or side #2 to enable management thereof.

In FIG. 11, the data paths which existed in the prior art radio bridge circuits are shown as dotted lines. The data paths which are shown as solid lines are new paths which have been implemented in the prior art radio bridges to enable the implementation of the inner and outer loop concept and splitting the traffic of the transmit and receive pairs of an Ethernet port onto two separate half duplex radio bridges.

The management of the radio bridges requires the use of Telnet, Web Browser and SNMP and Antenna Alignment Tool server functionalities. Each of these server functionalities are software modules that exist in each radio bridge and which listen to specifically assigned port numbers of the TCP/IP protocol packets. Therefore, to invoke any one of these server functionalities to manage a radio bridge, it is only necessary to send a TCP/IP packet on the inner loop with its port number field filled with the specific port number of the tool or server functionality to be invoked.

This is new over the prior art half duplex radio bridge. In the prior art, the radio bridge was half duplex and involved two radio bridges, one on each side. Each side had one Ethernet port which was Connected to one radio bridge. At any particular point in time, both radio bridges were sending in only one direction, hence the half duplex name. In other words, there was only one data path in each direction that went through both transceivers. Each radio transceiver had a transmitter and a receiver but only the transmitter on one side and the receiver on the other side would be active at any particular moment in time. In this prior art radio bridge, the Telnet, Web Browser, SNMP and Antenna Alignment Tools existed. Each tool had to monitor all packets transitioning along each path looking for packets directed to its port number, its IP address and its MAC address. There was no loop problem because the radio bridge was only coupled to one Ethernet port on each side and, by definition, when a broadcast packet entered one of those ports, it would not be sent back out the same port.

In order to make this prior art radio bridge into a full duplex radio bridge, it was necessary to add another pair of radio transceivers and then figure out how to solve the loop problem and how to get the management packets to the desired tool or tools in a selected radio transceiver. The solutions to these problems were to provide an inner loop and add new software to route management packets onto the inner loop and payload data packets onto the outer loop, and to add a splitter which allowed the use of only one Ethernet port on each side of the bridge but to segregate the transmit and receive data paths so that each data path functioned independently.

In the full duplex radio bridge embodiments disclosed herein, to allow the use of the Telnet, Web Browser, Antenna Alignment Tool, SNMP, etc. server functions and any new server functions, a need arose to redirect management TCP/IP or UDP packets onto the inner loop. This was done by making slight changes to the software of the radio bridge. These changes allow the use of the inner loop and portions of the outer loop to make sure that broadcast and unicast TCP/IP packets are properly delivered to all attached radio transceivers, thereby allowing proper server operation anywhere on the network. Whether part of the outer loop is involved in routing management packets depends upon the destination address of the management packet and where it originated.

In general, a learning bridge is a basic implementation of a transparent, layer 2 Ethernet learning bridge that learns the network topology by analyzing the source address of incoming frames from all attached networks.

The preferred embodiments disclosed herein add software modules A, B, C, D, E, F, C, H, J and K to the original circuitry and software of the radio bridge and modifies the original learning bridge code so that the learning function is disabled under certain circumstance. The original learning bridge code in the prior art radio transceivers that serve as the starting point for the embodiments disclosed herein had learning bridge code which watched the traffic passing through the bridge and modified routing tables kept by the learning bridge code to indicate on which side of each radio bridge particular MAC addresses resided. In other words, when a broadcast packet was sent out both the RF side of the bridge and the Ethernet side of the bridge, if the reply came from the Ethernet side, the routing tables of the learning bridge code would be modified to indicate that particular MAC address is on the Ethernet side of the bridge. With the addition of the inner loop and the various routing and filtering software modules detailed herein to implement the new embodiments, the learning bridge functionality can get confused under eight of the thirty different scenarios for determining the path back to the original requestor, and therefore, the occurrence of each of these eight different scenarios is watched for, and, when one occurs, the learning bridge software is disabled. The specific row numbers of Table 1 detailing these eight circumstances when the learning bridge function needs to be disabled are: 9, 11, 12, 13, 15, 17, 18 and 20.

The addition of the specific above identified software modules to the prior art learning bridge is only one example of how the radio bridges can be modify modified to implement the inner loop concept central to all the embodiments. Other software configurations can also be used and still be within the teachings of the invention, and it is only necessary to add some software functionality, regardless of configuration, which performs the following functions:

1) the ability to inspect incoming packets to determine if they are either broadcast packets or are unicast packets with destination addresses which reside in one of the radio bridge transceivers, and, if so, routing such packets onto the inner loop so that all transceivers receive them;

2) the ability to inspect packets propagating on the inner loop to determine if they are response packets, and if they are, routing these response packet onto the outer loop so they can propagate back to the original requestor;

3) the ability to filter packets to prevent looping conditions (packets cannot be sent back to the sender);

4) the ability to minimize sending of packets over the RF radio link by filtering out packets that might be destined to be transmitted over the RF but which can be removed from the RF queue without adverse affects on operations;

5) the ability to modify the prior art learning process to keep it from getting confused under certain circumstances (which can be determined from inspection of Table 1 below for the row numbers specified above—all eight of these circumstances involve situations where the input port and output are different transmissions mediums) and making improper changes to the routing tables under these circumstances.

Any radio bridge transceiver which has either hardware or software or some combination thereof which can perform the above five identified functions will suffice to practice the genus of the invention.

The changes needed to the prior art learning bridges needed to make them in accordance with the embodiment disclosed herein also allow all response packets from all attached radio transceivers to be directed back to the requestor for proper operation. These changes also allow the radio transceiver to interoperate talk to each other using the TCP/IP protocol stack, i.e., each radio transceiver tool can generate an TCP/IP packet addressed to any other port, IP address and MAC address on the network.

The primary software use of the inner loop is to make sure that any local external Ethernet packet that is destined for a radio transceiver connected to the receiving data path can receive the packets and respond back to the requestor. In the preferred embodiment, the system is designed to operate using equipment from a single vendor by requiring the first three bytes of the MAC address of any TCP/IP management packet to be a specific predetermined identifier indicating that the packet was intended to manage one of the four radio transceivers of the two radio bridges one at each end. This prevents TCP/IP management packets not having this predetermined identifier and which are not intended to manage one of the four radio transceivers from being routed onto the inner loop. The use of bridge MAC addresses, by a specific manufacturer, only prevents interoperability between vendors for managing the bridges, and is not required in all embodiments. In some embodiments, the software that makes the discrimination and routing decisions does not have this requirement. The only software restriction on the use of the inner loop for network management activities is that all attached bridge devices have the same IEEE three-octet OUI company ID used to generate unique MAC address for each Ethernet device from a specific manufacturer.

In FIG. 11, the bridge on side 1 includes radio transceivers 201 and 203, and the bridge on side 2 consists of radio transceivers 205 and 207. Each of radio transceivers 201 and 207 are identical functionally, and radio transceivers 203 and 205 are identical functionally. Ethernet port 209 on side 1 has its transmit pair 200 coupled to transceiver 201 and has its receive pair 211 coupled to transceiver 203. At side 2, Ethernet port 213 has its receive pair 215 coupled to transceiver 205 and has its transmit pair 218 coupled to transceiver 207.

The outer loop in FIG. 11 is comprised at least of data paths 200, 204, 210 and 215 going in one direction and 218, 220, 224 and 211 coming back in the other direction. The inner loop data path is comprised at least of data paths 202, 206, 226, 222, 208, 214, 212 and 216. Other data paths, software modules and the TCP/IP and learning bridge code inside the radio bridge transceivers are also involved in transporting management packets, as will be detailed in Table 1 below. Only management TCP/IP and reply TCP/IP packets flow on these inner loop data paths, and it is the responsibility of the routing software modules A and G to determine which packets are management or reply packets and route them onto the appropriate data path.

The functionality of the prior art radio bridges modified to be within the genus of new embodiments disclosed herein is detailed in the flowchart of FIG. 16. More specifically, FIG. 16, comprised of FIGS. 16A, 16B, 16C and 16D, is a flowchart of the functionality of the transceivers of the prior art radio bridges as modified by the addition of various routing and filtering functionality (which can be implemented either in hardware or software) to be within the genus of new embodiments disclosed herein. FIG. 16A is a flow diagram of the functionality implemented by the various software modules of the transceiver 201 in FIG. 11. Incoming packets arrive from the Ethernet network port 209 arrive on data path 200 where function 217A, (part of the software module A) determines if each incoming packet is a broadcast or a unicast packet having a predetermined number called an OUI number (manufacturer specific) as part of its destination MAC address. In the claims, routing software module A will be called a routing circuit because it is generally implemented using a suitably programmed microprocessor. The routing of packets onto data path 202 is done solely by the routing circuit 217, but the routing of packets onto the outer loop data path 204 is done by central circuit 282 in transceiver 201 (similarly for routing circuit 235 in transceiver 207).

All of these incoming packets on data path 200 are also coupled via data path 238 to circuit 282 also regardless of the processing of function 217. Each transceiver has a circuit 282 which is generally a microprocessor programmed to carry out management functions and implement a learning bridge which learns the network topology from analyzing the source and destination addresses of packets passing through the bridge. The circuit 282 will be referred to herein as the central circuit or learning bridge code from time to time. However, it is really a programmed microprocessor in most embodiments which is prior art except for one modification. In the embodiments disclosed herein, the bridge code is modified to recognize one of the eight situations identified elsewhere herein wherein the bridge code could become confused and make incorrect entries in the routing table. These situation arise from the fact that in the embodiments disclosed herein there is an inner loop, while in the prior art half duplex radio bridge transceivers there was no inner loop.

It is because there is an inner loop in the embodiments disclosed herein which makes it necessary to have a routing function to recognize selected management packets and put them on the inner loop while also recognizing payload packets and putting them on the outer loop as well as recognizing management packets which need to be sent on the outer loop to get to the transceiver to which they are addressed. This routing function is carried out in transceiver 201 by software module A at 217 and the circuit 282. Specifically, software module A at 217 (and its counterpart software module A at 235 in transceiver 207) operates as follows to recognize certain management packets and route them onto the inner loop. If a packet arriving on path 200 is either a broadcast or transceiver specific unicast packet, it is a management packet which needs to be routed onto the inner loop (in transceiver 207, router software A recognizes broadcast packets and transceiver specific unicast packets and puts them onto the inner loop). A "transceiver specific" unicast packet is one which has as the first three bytes (the "OUI code") of the destination MAC address a predetermined number which is manufacturer specific. In the claims, the OUI code is referred to as a "predetermined number". If those three bytes are the predetermined number it means that the packet needs to be analyzed by the central circuit (286, 276 or 280) of one of the other transceivers. In such a case, the packet is routed to function 217B where it is tagged as a management packet coming from the attached Ethernet network and is forwarded onto the inner loop data paths 202 and 206 where it is received by filter module F at 284 in FIG. 16B. All broadcast and unicast packets routed onto data path 202 (or data path 216 in transceiver 207) are tagged.

Figure 16A:
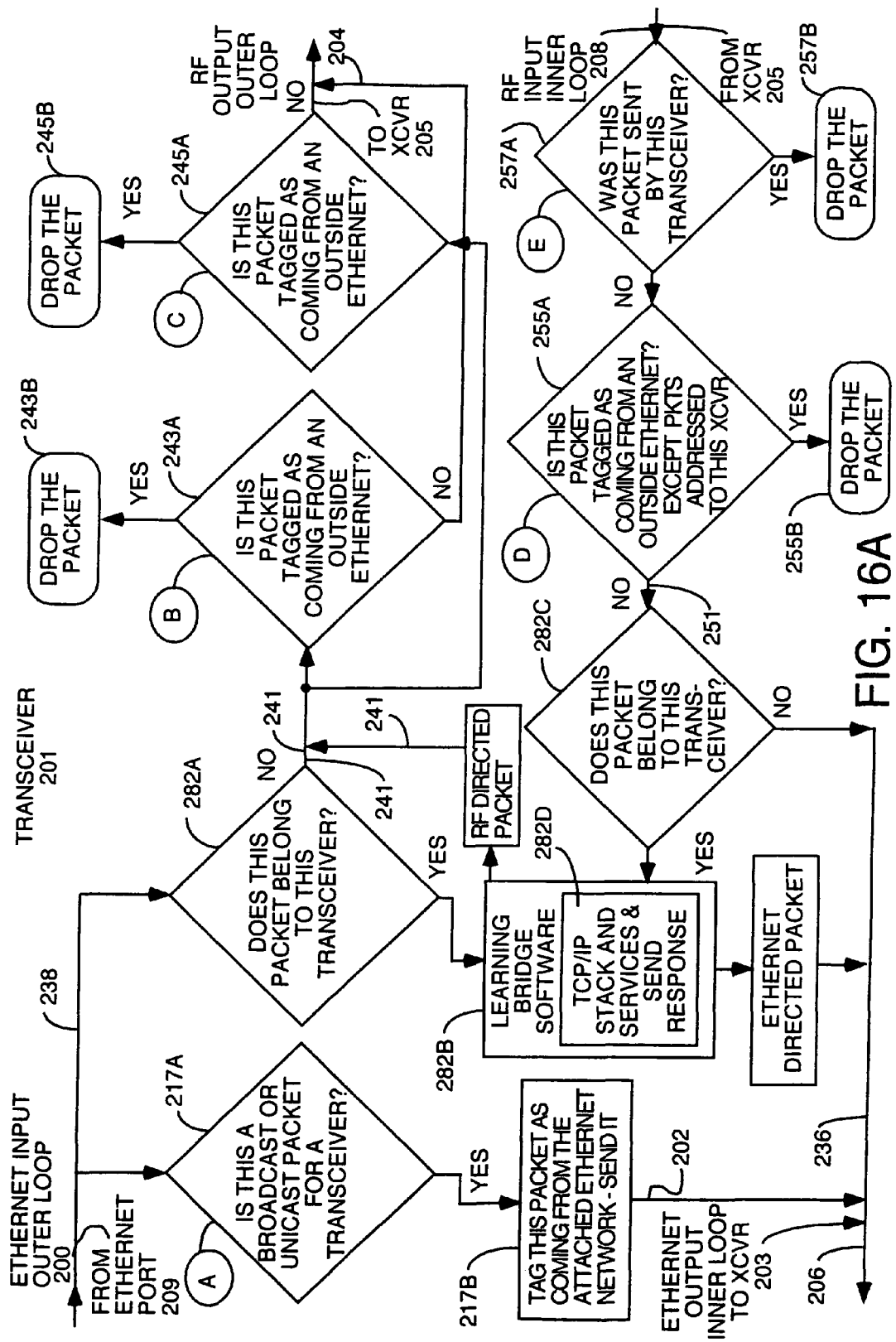
FIG. 16, comprised of FIGS. 16A, 16B, 16C and 16D, is a flowchart of the functionality of the transceivers of the prior art radio bridges as modified by the addition of various routing and filtering functionality (which can be implemented either in hardware or software) to be within the genus of new embodiments disclosed herein.
Figure 16B:
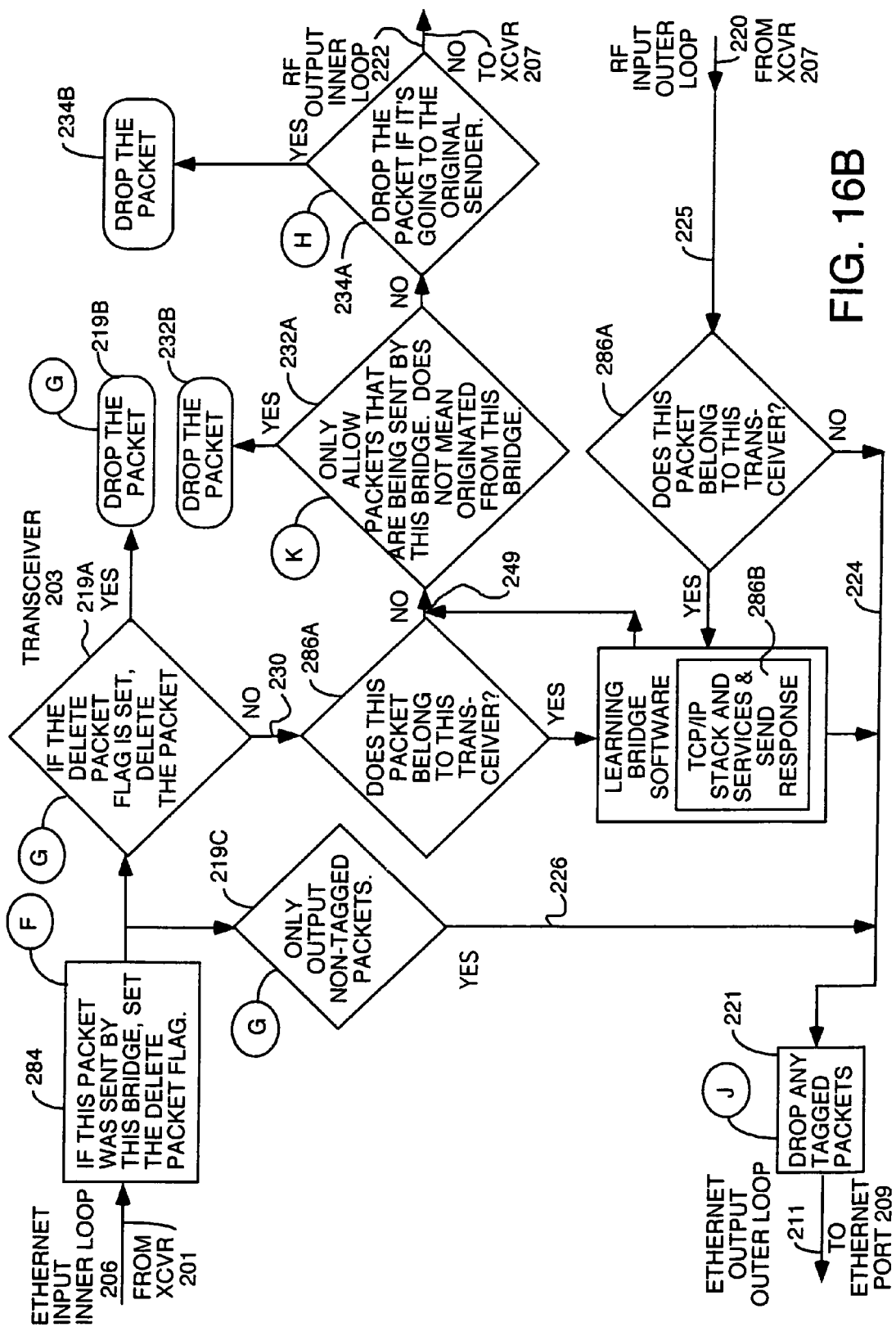

FIG. 16B shows the functionality of transceiver 203. Filter module F at 284 (referred to in the claims sometimes as a first filtering circuit because it is usually implemented as a programmed microprocessor) in transceiver 203 determines if the incoming packet on data path 206 originated in transceiver 203 so that such packets can be deleted so as to prevent a looping condition that would suck up all the inner loop bandwidth. If the arriving packet did originate in bridge 203, the packet is tagged for deletion by function 284 by setting a delete flag, but if the arriving packet did not originate in transceiver 203, it is forwarded to software module G shown at 219A, 219B and 219C (referred to in the claims as a second filtering circuit because it is usually implemented using a programmed microprocessor) and the delete flag is not set. Function 219A receives the packet and deletes it in function 219B if the delete flag is set. Function 219C receives packets output by function 284 and determines if they were tagged by function 217A in FIG. 16A as having come from the external network. Function 219C is a gateway to the outer loop and its function is to only allow non-tagged management packets to get to the outer loop since non tagged management packets are response packets generated by a transceiver in the radio bridge which need to be routed back to the original requestor. Thus, function 219C only outputs non-tagged packets onto path 226. Since only tagged management packets and untagged response packets arrive on data path 206, only non tagged response packets get past filter function 219C (filter G) onto path 226. Filter function J at 221 drops any tagged packets to prevent looping conditions by keeping tagged packets off data path 211 which leads back to Ethernet port 209 in FIG. 11. Tagged packets may have come from port 209 so they are not to be sent back to it to prevent looping. Filter function J is also only required in embodiments where the transceiver radio boards are purchased from an OEM who wrote their operating systems in such a way that it is possible for tagged packets to sometimes be routed by a multiplexer function in the operating system code toward path 211. If the radio transceivers were to be built "from scratch" by the inventor so that tagged packets would never get routed toward path 211 from the central circuit of transceiver 203, filter function J at 221 would be unnecessary and that would be an alternative embodiment.

Function 219A forwards both tagged and non-tagged packets which have not been marked for deletion along data path 230 to learning bridge software process 286A. The learning bridge function 286A determines if the packet is addressed to transceiver 203, and, if so, forwards it to learning bridge function 286B. Function 286B examines the packet addresses, updates the routing tables to reflect whatever is learned about network topography (except in one of the eight cases identified herein—see the comments below on how the learning bridge function is modified) and if the packet is a management packet addressed to transceiver 203, whatever management function is listening to the port address in the packet header will be invoked to do whatever the management packet is requesting. The learning bridge functions 286B in FIGS. 16B and 282D in FIG. 16A and their counterparts in FIGS. 16C and 16D must be modified from their prior art states to include a function which looks for one of the eight cases where the learning bridge can get confused and disable the process of updating the routing tables. This code looks to determine upon which port of the transceiver an incoming management packet arrived and caches the source MAC address and associates the stored MAC address with the port upon which it arrived in an alternate routing table. Then that information is used each time an outgoing management packet is to be sent by intercepting the lookup to the standard routing table and diverting the lookup to the alternate routing table. The destination MAC address of the packet being built for transmission is looked up in the alternate routing table and the port associated with that destination MAC address is used to determine the routing of the outgoing packet.

Learning bridge function 286A forwards any broadcast packets (which are always deemed to be management packets) and any tagged management packets or response packets addressed to any transceiver other than 203 to filter software modules K and H at 232A and 234A. Function 232A only passes management packets which are being sent on the inner loop from this transceiver 203 out RF output inner loop link 222. This does not mean that they were originated by transceiver 203. These packets may also be tagged management packets addressed to bridge 207 or response packets addressed to a device on bridge 207 which sent a management packet to some other transceiver in the radio bridge. Any packet which does not meet the filter criteria is dropped in function 2326.

The packets forwarded by function 232A are received by filter function H at 234A which functions to filter out packets having source MAC addresses in the encapsulated Ethernet packet which match the destination MAC address in the RF packet header. If they match, this indicates the packets to be sent to transceiver 207 were sourced by transceiver 207 and a possible looping condition is present. If there is a match, the packet is dropped at 25B. This also prevents unnecessary consumption of bandwidth on RF link 222.

Packets arriving at transceiver 203 via RF outer loop data path 220 and data path 225 are received by central circuit 286B (management functions and learning bridge function) where the learning; process happens to update the routing tables except in one of the eight cases identified above. If the packet is a management packet addressed to transceiver 203, the management function listening to the port number identified in the packet is addressed and launches to do whatever management function the packet is requesting.

If the packet arriving from 286A is a payload packet, learning bridge function 286B forwards it to filter software module J at 221 where the packet is dropped if it is a tagged packet but forwarded onto data path 211 if it is not a tagged packet (only management packets arriving from the external network and addressed to one of the transceivers of the radio bridge are tagged). This is how payload data packets get across the radio bridge from Ethernet port 213 in FIG. 11 to Ethernet port 211.

Returning to the consideration of FIG. 16A, central circuit 282A receives packets on data paths 238 and determines whether this packet is a management packet addressed to transceiver 201. If it is, the packet is forwarded to learning bridge function 282B where the learning bridge learns whatever can be learned about the network topology from the packet header information, except in one of the eight cases identified herein where the learning bridge function is disabled. That learned information is stored in routing tables kept by the learning bridge code. If the packet is a management packet addressed to transceiver 201, whatever management functionality 282D that is listening to the port number contained in the packet header is invoked to do the requested management function, and a response management packet is generated. The routing tables in the learning bridge are consulted to determine whether the device to which the response packet is to be sent is on the RF side of the bridge or the Ethernet side. If the device to which the response packet is addressed is determined from the routing table to be on the Ethernet side of transceiver 201, the response packet is launched on data path 236 for coupling to data path 206 and inner loop transmission to filter function F shown at 284 in FIG. 16B. Data path 236 will carry both non tagged response packets to management packets or non tagged management packets generated in transceiver 201 and addressed to either transceiver 203 or 207. If the response packet is directed to a unit coupled to the RF side of the radio bridge, the response management packet is output on data path 241 to filter functions B and C shown at 243A and 243B and 245A and 245B in FIG. 16A. Filter functions 243A and 245A appear to do the same thing, and their existence in this embodiment is a function of the fact that the operating system of the radio transceiver boards was not written by the inventor but was written by the manufacturer of the prior art radio board which was modified in accordance with the teachings of the invention. The existence of filter function 245A is necessary because the filter function 243A occurs earlier in the code line of the radio transceiver, and, in some circumstances, tagged packets can attempt to be routed to the outer loop at later points in the transceiver code. Filter function 245A and 245B detects these tagged packets and drops them before they get to the outer loop.

Filter function B at 243A determines if the packet arriving on 241 is tagged as a management packet coming from an outside network and, if yes, drops it as represented by block 243B. Tagged packets are management packets that came from a connected packet network and which were routed onto the inner loop because they had a predetermined number called an OUI code in their destination MAC address. Response management packets are never tagged. Thus, the response packet generated by learning bridge code 282D is passed through filter function B to outer loop data path 204 for transmission to transceiver 205. However, any tagged management packet which happened to find its way onto data path 241 from function 282A would be dropped by filter function B at 243A. If the packet received by function 243A is not to be dropped, function 243A encapsulates into an outer RF packet which encapsulates the Ethernet packet. Filter function B is not necessary in all embodiments. Filter function B is only necessary in embodiments where a radio transceiver is purchased from a vendor which wrote the operating system and that operating system includes a multiplexer function which sometimes decides to send tagged packets on data path 241. If the radio boards were to be manufactured "from scratch" and all their code were to be written by the inventor, that code would never send a tagged packet on data path 241, and filter function B would not be necessary.

Filter function C at 245A also receives all the data packets travelling on data path 241 from either learning bridge 282D or function 282A and does the same things as functions 243A and 243B. The difference is that functions 243A and 243B, in this embodiment, are a failsafe to prevent transmission over the RF link of packets forwarded by the OEM operating system code of the radio which is not under control of the inventors. Any packets passing through the gauntlet of filter and routing functions described herein and arriving at data path 204 are converted by conventional circuitry from data packets into RF signals and transmitted. Payload packets addressed to the other network will arrive on path 200 and pass through function 282A unchecked and will pass through filter functions B and C unhindered to data path 204 because payload data packets are never tagged.

Transceiver 201 can also receive management data packets on inner loop RF data path 208 from transceiver 205. These packets are recovered from the radio frequency signals by the prior art physical layer circuitry of the transceiver and output to filter function E shown at 257A. This filter function E determines if the incoming packet has a source MAC address of the Ethernet packet which was encapsulated in the RF packet to determine if the packet was sourced by transceiver 201. If it was sourced by transceiver 201, the packet is dropped, as represented by block 257B. If the packet is not dropped, it is forwarded to filter function D at 255A. This function 255A determines if the incoming packet is a tagged management packet coming in from an outside network which is not addressed to transceiver 201, and, if that is the case, drops the packet in 255B. Tagged management packets addressed to transceiver 201 will be output on path 251 to central circuit 282C which determines whether the incoming management packet is addressed to this transceiver. If it is, the packet is sent to central circuit 282D where the topology learning function happens (under predetermined circumstances), and whatever management function the packet is intended to invoke (if that is the case) is invoked. If the incoming packet is a response packet to some packet generated earlier by some function in the central circuit, it is directed to whatever management function code generated the original management packet. If the incoming management packet is from some device which is not in the routing table and is addressed to transceiver 201, the central circuit will carry out the management function, generate a response packet and then determine from the routing table that it is not known whether the device to which the response packet is to be sent is on the RF side or the network side of the transceiver. In such a case, the central circuit will forward the response packet both toward the inner loop packet network port 206 and the RF outer loop output port 204. This functionality is implemented in all the central circuits of all the transceivers in both bridges when there is no entry in their routing tables for the device to which a packet is to be sent. In such cases, the central circuit route the packet out both the data path headed toward the RF side of the transceiver and the data path headed toward the network side of the transceiver.

The packets arriving at 282C are never payload data packets but they could be either response management packets addressed to bridge 203 or 207 or management packets sourced in transceiver 205 and addressed to either transceiver 203 or 207. Such packets will be forwarded by 282C onto data path 236 for output on inner loop data path 206.

Figure 16C:
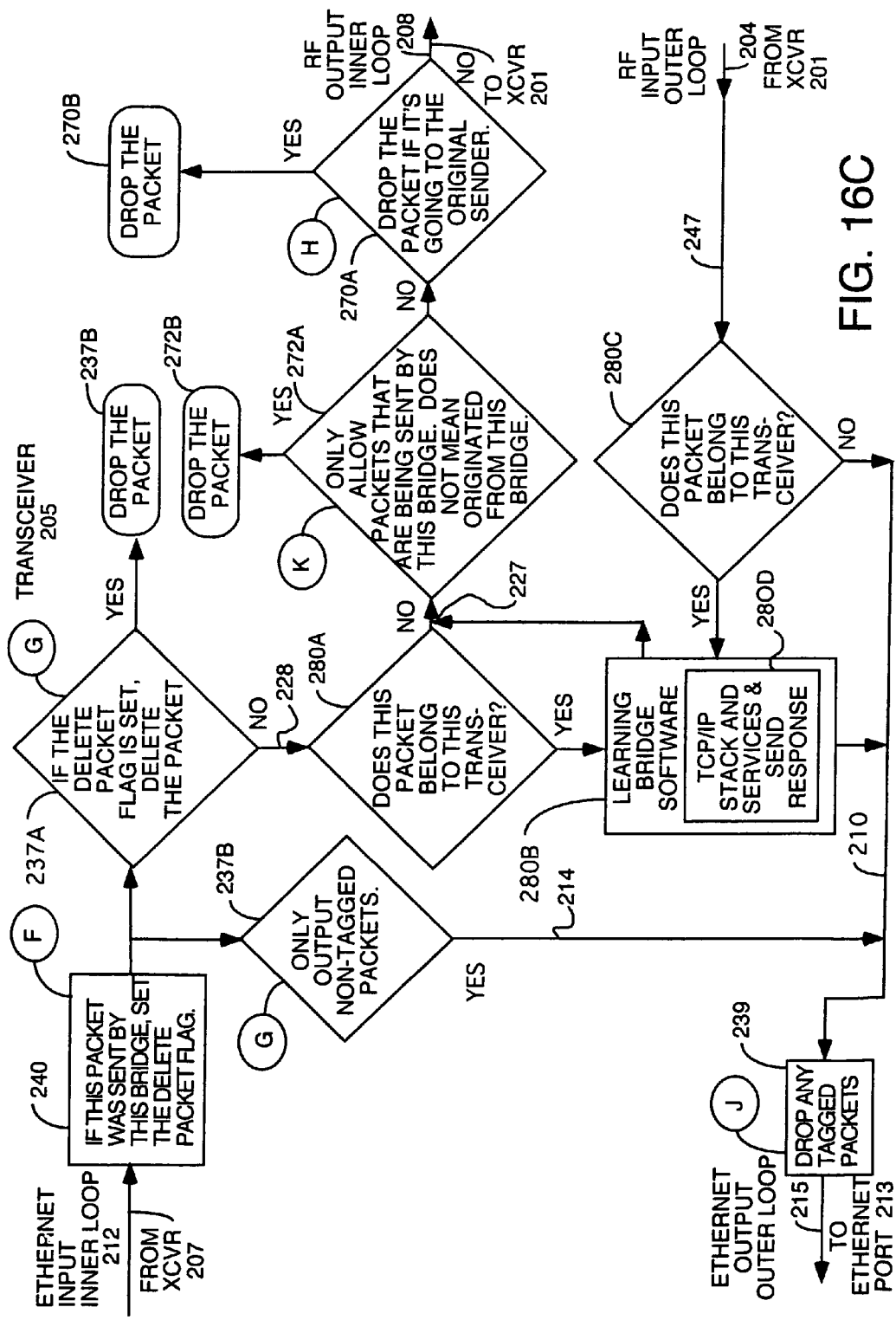
Figure 16D:
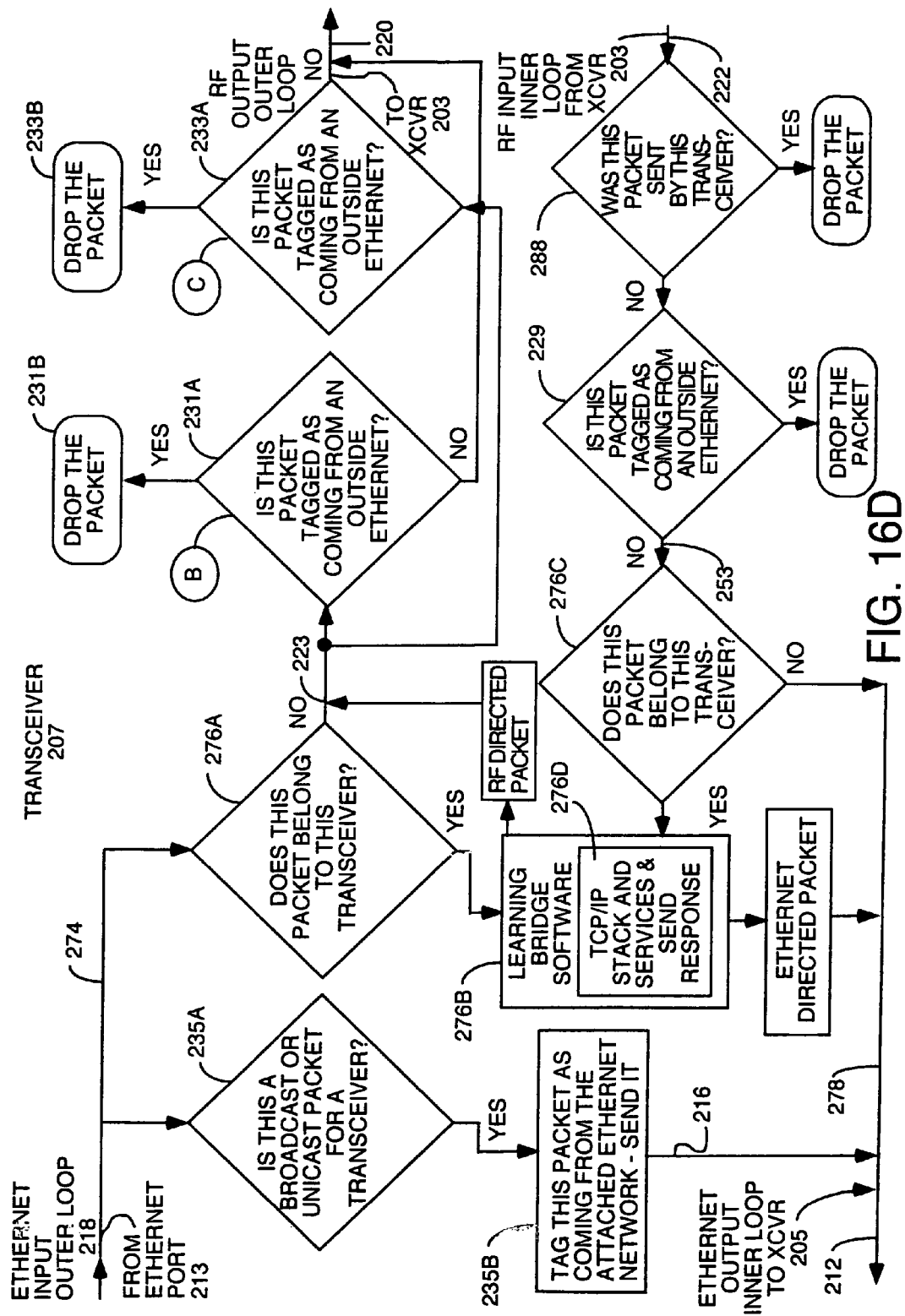

FIGS. 16C and 16D show the same functionality as was just described for transceivers 203 and 205, but for transceivers 205 and 207. The various functional blocks and data paths have been labeled with the reference numbers of transceivers 205 and 207 in FIG. 11, but no further explanation will be given as the functions of these routing and filter blocks are the same as their counterparts in transceivers 201 and 203.

The following packet flow description assumes that communication is functioning correctly over paths 204, 208, 222 and 220. What that means is the transceiver 205 is properly configured to talk to transceiver 201, and transceiver 203 is properly configured to talk to transceiver 207. Properly configured means that the frequency, bandwidth, encryption type and opposite unit's MAC address have all been set properly in the configuration data of the transceiver.

Side 1

All packets from an attached local wired network Ethernet port 209 are transmitted to transceiver 201 on path 200 and all packets to be transmitted to the Ethernet port 209 are transmitted from transceiver 203 on paths 224 and 211. If the packet on 200 is a broadcast packet for any device or is a unicast packet, the routing software A at 217 routes the packet onto both the outer loop data path 204 (via data path 238, learning bridge code 282 and data path 241) as well as onto the local loop data path 202 so that the broadcast and unicast packets reach radio transceivers 201, 203, 205 or 207 in addition to being sent across the link on the outer data path to Ethernet port 213 (the same thing happens in the bridge on side 1). In addition, if the packet arriving on path 200 is a broadcast or unicast packet addressed to one of the transceivers and is a management packet, then routing software A at 217 tags the management packet as coming in from the external Ethernet network. In such a case, the broadcast or unicast packet is sent to the other transceivers via data path 202. Tagged packets are only allowed to propagate on the inner loop, and the filter software will kill such a packet if it is on a path which would take it to the outer loop. The tags assist the routing software modules to properly route inner loop packets and prevent possible inner loop infinite looping conditions.

If the packet arriving at routing software module A at 282 is not a management packet addressed to transceiver 201, it is sent out path 204 (via paths 238 and 241 and the bridge code of transceiver 201) to transceiver 205 for processing. The packets sent out outer loop data path 204 can be payload data packets destined for a device connected to the remote Ethernet network (port 213) or they can be broadcast or unicast management packets addressed to transceiver 205 which transceiver 205 needs to see.

If the packet arriving on data path 200 is a management packet addressed to transceiver 201, software module A routes it onto paths 238 and 202. The bridge code 282 of transceiver 201 then processes the management packet, and generates one or more response packets. This response packet is sent out via data paths 236 and 206 to the inner loop. The response packet is analyzed by routing software G at 219 and sent out data path 226 to the outer loop data path 211 as a packet sourced by transceiver 201. Data path 226 terminates at a filter software module J shown at 221 which merges the response packet with data packets from data path 224 onto data path 211 where it travels back to the requestor.

Inner loop management packets propagating on path 202 are directed onto the inner loop path 206 for processing by the transceivers 203 and 207. These packets on data path 206 are inner loop packets which are always broadcast packets, unicast management packets or response packets. All these packets are TCP/IP packets, and the protocol to establish connections between devices on the inner loop is therefore the same as is used in TCP/IP protocol connects in the prior art such as on the internet.

If the packets are tagged in routing software A at 217 as having come from the external attached Ethernet network, they are routed onto data path 206 via data path 202 to be analyzed by routing software G at 219 in transceiver 203. If the packets arriving on 206 are broadcast packets, any unicast packet that are not addressed to transceiver 203, they are routed by software module G at 219 onto inner loop data path 222 (via data paths 230, bridge code 286 and data path 249 and filter modules K and H at 232 and 234), and they are also routed onto data path 226. If the packet arriving on path 206 is a tagged management packet which is addressed to transceiver 203, then routing software G at 219 transmits the packet to bridge code 286 via 230. Bridge code 286 does the requested management function and generates one or more response packets which are sent out paths 224 and 211 to be returned to the requestor and are also sent out data paths 249 through filter code H and K at 232 and 234 and data path 222 to transceiver 203 where they are routed back to the requestor coupled to Ethernet port 213 via filter code D and E at 229 and 288, data path 253, bridge code 276, data path 212, filter code F at 240, routing code G at 237, data path 214, filter code J at 239 and data path 215.

Packets coming into transceiver 205 on outer loop data path 204 could be either payload data packets or management packets. They are analyzed by bridge code 280 in transceiver 205, and if the packet is not addressed to bridge 205, it is sent out data path 210 and data path 215 to the attached Ethernet network coupled to port 213. This is how payload data packets traverse transceivers 201 and 205 via the outer loop to get from Ethernet port 209 to Ethernet port 213.

Any response packet from any device connected to port 213 will come back via port 213 and be placed on data path 218. If the packet on outer loop path 204 is a management packet addressed to transceiver 205, the requested management function is performed, and a response of one or more packets is generated by bridge code 280 in transceiver 205 and sent out on data path 227 and inner loop data path 208 to transceiver 201. There, the packet is filtered by new software modules D and E at 255 and 257. Filter module D only allows packets addressed to transceiver 201 to pass and response packets from transceiver 205 to continue on path 251. Filter software E at 257 drops any packet which was originally sent by transceiver 201 to prevent looping. Since, in this example the packet arriving on line 208 is a response packet from transceiver 205, it is forwarded onto data path 206 (via code D, E, path 251, bridge code 282 and data path 236 to path 206. The response packet in this example is analyzed by software module G at 219, and sent out path 226 for merging with packets from data path 224 and sent back to the requestor via data path 211.

Packets coming in to transceiver 207 on inner loop data path 222 are analyzed to determine if they are addressed to transceiver 207. If they are not addressed to transceiver 207, the packet is dropped by filter software D at 229. If the packet is addressed to transceiver 207, the management packet is processed by bridge code 276, and one or more response packets are generated and sent out paths 223 and 220. These packets are filtered by filter software modules B and C at 231 and 233. Filter software module B at 231 drops any management packets that have been tagged as having come from the external network. Filter software module C at 233 does the same thing (for packets coming through different paths through the code). Since, in this example, the packets are response packets generated by transceiver 207, they are forwarded by filter software B and C to transceiver 203 via data path 225, bridge code 286, and data paths 224 and 211 for transmission back to the requestor.

Side 2

All packets from an attached local wired network Ethernet port 213 are transmitted to transceiver 207 on path 218 and all packets to be transmitted to the Ethernet port 213 are transmitted from transceiver 205 on paths 210 and 215. If the packet on 218 is a broadcast packet for any device or is a unicast packet, the routing software A at 235 routes the packet onto both the outer loop data path 220 (via data paths 274 and 223 as well as onto the local loop data path 216 so that the broadcast and unicast packets reach radio transceivers 201, 203, 205 or 207 in addition to being sent across the link on the outer data path to Ethernet port 209 (the same thing happens in the bridge on side 1). In addition, if the packet arriving on path 218 is a broadcast or unicast packet addressed to one of the transceivers and is a management packet, then routing software A at 235 tags the management packet as coming in from the external Ethernet network. In such a case, the broadcast or unicast packet is sent to the other transceivers via data path 216. Tagged packets are only allowed to propagate on the inner loop, and the filter software will kill such a packet if it is on a path which would take it to the outer loop. The tags assist the routing software modules to properly route inner loop packets and prevent possible inner loop infinite looping conditions.

If the packet arriving at routing software module A at 235 is not a management packet addressed to transceiver 207, it is sent out path 220 (via paths 274 and 223 and the bridge code of transceiver 207) to transceiver 203 for processing. The packets sent out outer loop data path 220 can be payload data packets destined for a device connected to the remote Ethernet network (port 209) or they can be broadcast or unicast management packets addressed to transceiver 203 which transceiver 203 needs to see.

If the packet arriving on data path 218 is a management packet addressed to transceiver 207, software module A routes it onto paths 274 and 216. The bridge code 276 of transceiver 207 then processes the management packet, and generates one or more response packets. This response packet is sent out via data paths 278 and 212 to the inner loop. The response packet is analyzed by routing software G at 237 and sent out data path 214 to the outer loop data path 215 as a packet sourced by transceiver 207. Data path 214 terminates at a filter software module J shown at 239 which merges the response packet with data packets from data path 210 onto data path 215 where it travels back to the requestor.

Inner loop management packets propagating on path 216 are directed onto the inner loop path 212 for processing by the transceivers 205 and 201. These packets on data path 212 are inner loop packets which are always broadcast packets, unicast management packets or response packets. All these packets are TCP/IP packets, and the protocol to establish connections between devices on the inner loop is therefore the same as is used in TCP/IP protocol connects in the prior art such as on the internet.

If the packets are tagged in routing software A at 235 as having come from the external attached Ethernet network, they are routed onto data path 212 via data path 216 to be analyzed by routing software G at 237 in transceiver 205. If the packets arriving on 212 are broadcast packets, any unicast packet that are not addressed to transceiver 205, they are routed by software module G at 237 onto inner loop data path 208 (via data paths 228, bridge code 280 and data path 227 and filter modules K and H at 272 and 270), and they are also routed onto data path 214. If the packet arriving on path 212 is a tagged management packet which is addressed to transceiver 205, then routing software G at 237 transmits the packet to bridge code 280 via 228. Bridge code 280 does the requested management function and generates one or more response packets which are sent out paths 210 and 215 to be returned to the requestor and are also sent out data paths 227 through filter code H and K at 272 and 270 and data path 208 to transceiver 205 where they are routed back to the requestor coupled to Ethernet port 209 via filter code D and E at 255 and 257, data path 251, bridge code 282, data path 206, filter code F at 284, routing code G at 219, data path 226, filter code J at 221 and data path 211.

Packets coming into transceiver 203 on outer loop data path 220 could be either payload data packets or management packets. They are analyzed by bridge code 286 in transceiver 203, and if the packet is not addressed to bridge 203, it is sent out data path 224 and data path 211 to the attached Ethernet network coupled to port 209. This is how payload data packets traverse transceivers 207 and 203 via the outer loop to get from Ethernet port 213 to Ethernet port 209.

Any response packet from any device connected to port 209 will come back via port 209 and be placed on data path 200. If the packet on outer loop path 220 is a management packet addressed to transceiver 203, the requested management function is performed, and a response of one or more packets is generated by bridge code 286 in transceiver 203 and sent out on data path 249 and inner loop data path 222 to transceiver 207. There, the packet is filtered by new software modules D and E at 229 and 288. Filter module D only allows packets addressed to transceiver 207 to pass and response packets from transceiver 203 to continue on path 253. Filter software E at 288 drops any packet which was originally sent by transceiver 207 to prevent looping. Since, in this example the packet arriving on line 222 is a response packet from transceiver 203, it is forwarded onto data path 212 (via code D, E, path 253, bridge code 276 and data path 278 to path 212. The response packet in this example is analyzed by software module G at 237, and sent out path 214 for merging with packets from data path 210 and sent back to the requestor via data path 215.

Packets coming in to transceiver 201 on inner loop data path 208 are analyzed to determine if they are addressed to transceiver 201. If they are not addressed to transceiver 201, the packet is dropped by filter software D at 255. If the packet is addressed to transceiver 201, the management packet is processed by bridge code 282, and one or more response packets are generated and sent out paths 241 and 204. These packets are filtered by filter software modules B and C at 243 and 245. Filter software module B at 243 drops any management packets that have been tagged as having come from the external network. Filter software module C at 245 does the same thing (for packets coming through different paths through the code). Since, in this example, the packets are response packets generated by transceiver 201, they are forwarded by filter software B and C to transceiver 205 via data path 247, bridge code 280, and data paths 210 and 215 for transmission back to the requestor.

Table 1 below documents all the possible payload data packet paths and all the possible management data packet paths and details the data path numbers that each type packet propagates upon for each scenario. Each row in the table is one scenario.

TABLE 1

Figure 12:
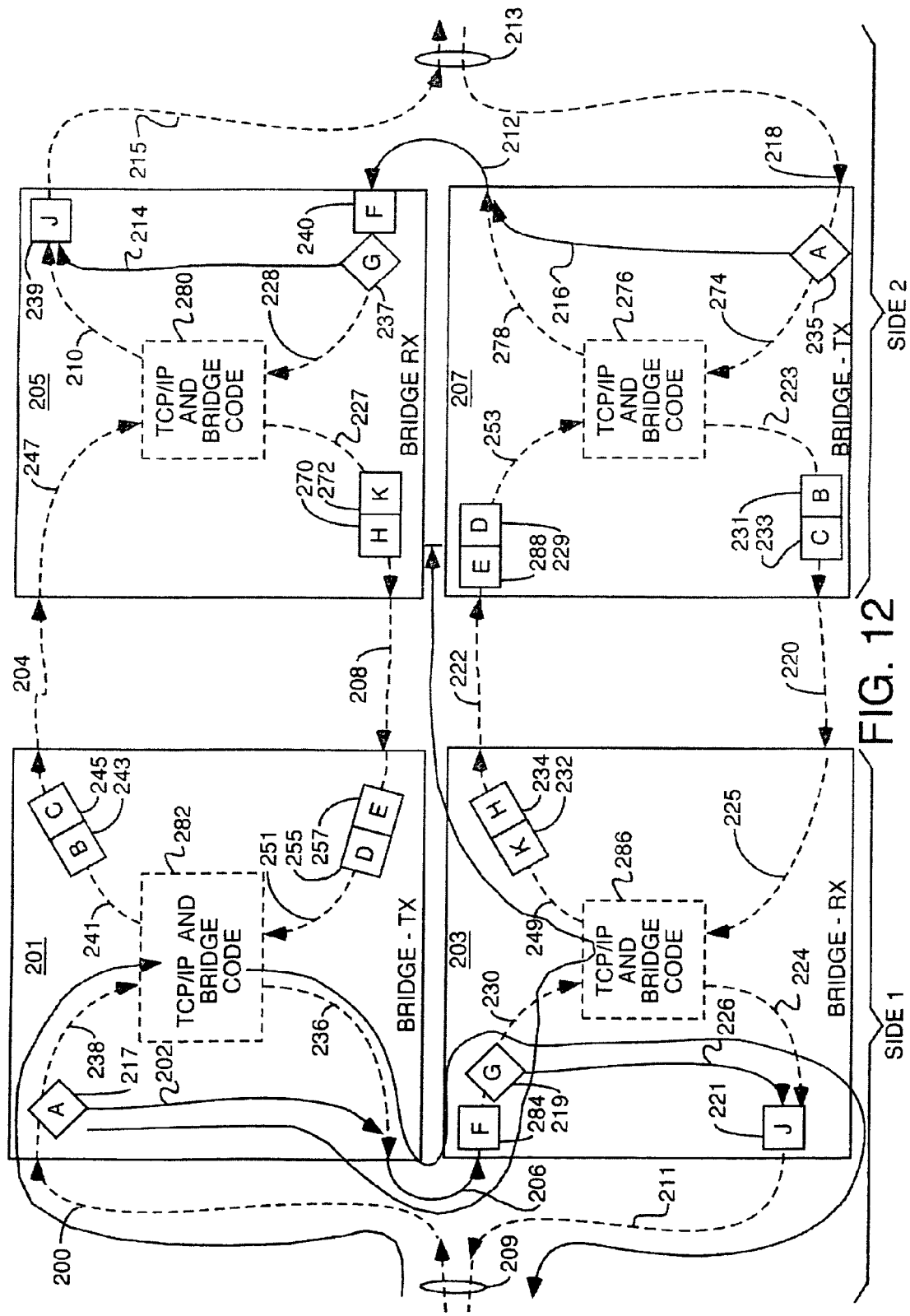
FIG. 12 illustrates the request path, response path and extra paths traveled by the request packet and response packets for the scenario of row 1 of Table 1 where the packet source is the Ethernet port 209 and the incoming packet from Ethernet port 209 is either a broadcast packet or a unicast management packet addressed to transceiver 201.
Figure 13:
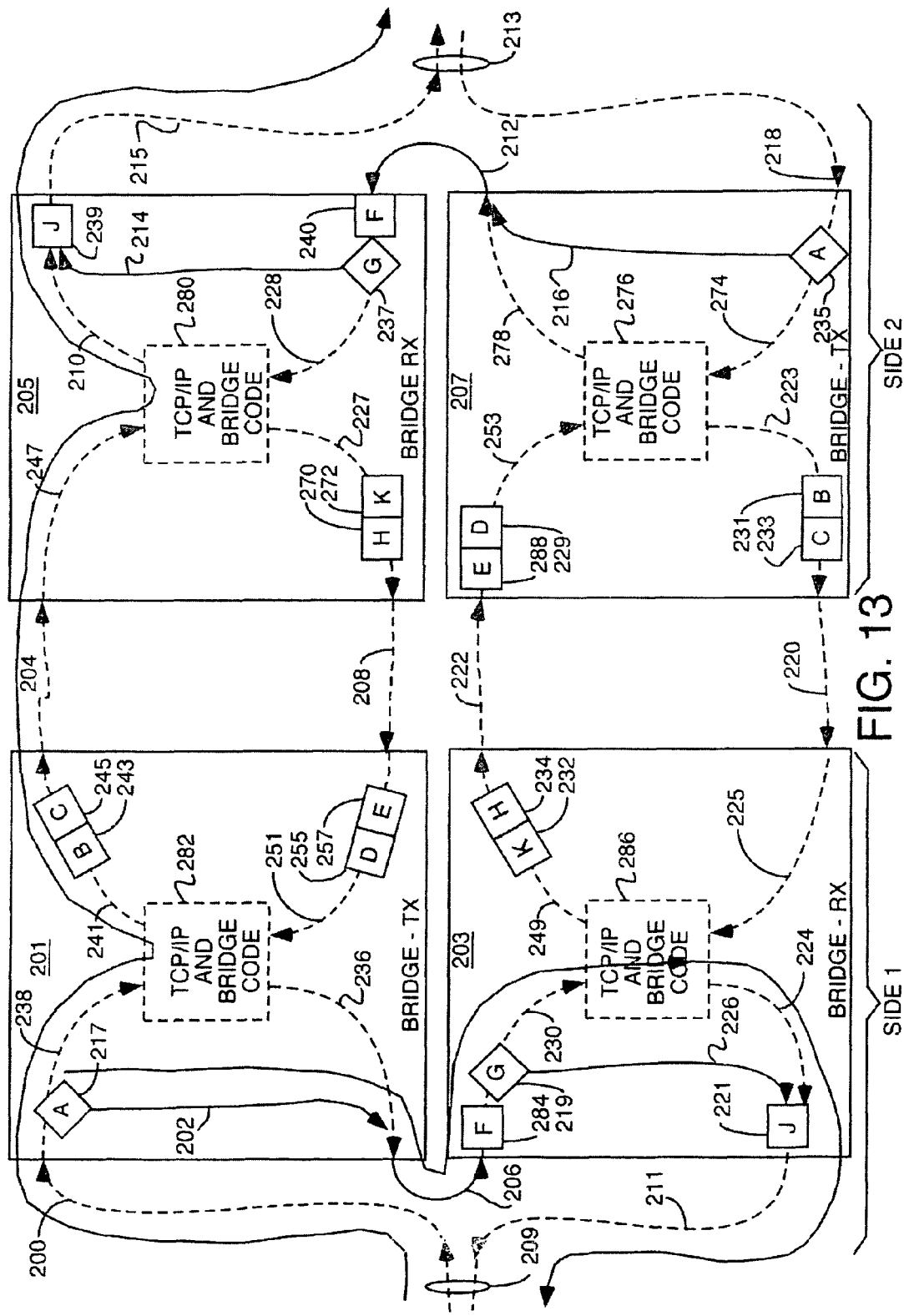
FIG. 13 illustrates the request path, response path and extra paths traveled by the request packet and response packets for the scenario of row 2 of Table 1 where the packet source is the Ethernet port 209 and the incoming packet from Ethernet port 209 is either a broadcast packet or a unicast management packet addressed to transceiver 203.

| | | Data Paths | | |
|---|---|---|---|---|
| Packet Source | Packet Destination | Request Paths | Response Paths | Extra Path And Remarks |
| Ethernet Port 209 | Transceiver 201 | 200, 217, 238 | 236, 206, 284, 219, 226, 221, 211 | 217, 202, 206, 284, 219, 230, 286, 249, 232, 234, 222, 288 where it is stopped by filter action. The request path, response path and extra paths are graphically illustrated in FIG. 12. |
| Ethernet Port 209 | Transceiver 203 | 200, 217, 202, 206, 284, 219, 230, 286 | 224, 221, 211 | 217, 238, 282, 241, 243, 245, 204, 247, 280, 210, 239, 215 and out 213. FIG. 13 illustrates the request path and the response path and extra paths. |
| Ethernet Port 209 | Transceiver 205 | 200, 217, 238, 282, 241, 243, 245, 204, 247 | 227, 272, 270, 208, 257, 255, 251, 282, 236, 206, 284, 219, 226, 221, 211 | 217, 202, 206, 284, 219, 230, 286, 249, 232, 234, 222, 288 |
| Ethernet Port 209 | Transceiver 207 | 200, 217, 202, 206, 284, 219, 230, 286, 249, 232, 234, 222, 288, 229, 253 | 223, 231, 233, 220, 225, 286, 224, 221, 211 | 217, 238, 282, 241, 243, 245, 204, 247, 280, 210, 239, 215 |
| Ethernet Port 213 | Transceiver 207 | 218, 235, 274 | 278, 212, 240, 237, 214, 239, 215 | 235, 216, 212, 240, 237, 228, 280, 227, 272, 270, 208, 257 |
| Ethernet Port 213 | Transceiver 205 | 218, 235, 216, 212, 240, 237, 228 | 210, 239, 215 | 235, 274, 276, 223, 231, 233, 220, 225, 286, 224, 211 |
| Ethernet Port 213 | Transceiver 203 | 218, 235, 274, 276, 223, 231, 233, 220, 225 | 249, 232, 234, 222, 288, 229, 253, 276, 278, 212, 240, 237, 214, 239, 215 | 235, 216, 212, 240, 237, 228, 280, 227, 272, 270, 208, 257 |
| Ethernet Port 213 | Transceiver 201 | 218, 235, 216, 212, 240, 237, 228, 280, 227, 272, 270, 208, 257, 255, 251 | 241, 243, 245, 204, 247, 280, 210, 239, 215 | 235, 274, 276, 223, 231, 233, 220, 225, 286, 224, 211 |
| Transceiver 201 | Transceiver 203 | 236, 206, 284, 219, 230 | 249, 232, 234, 222, 288, 229, 253, 276, 278, | 219, 226, 221, 211 & 237, 214, 239, 215 |

TABLE 1-continued

Data Paths

| Packet Source | Packet Destination | Request Paths | Response Paths | Extra Path And Remarks |
|---|---|---|---|---|
| | | | 212, 240, 237, 228, 280, 227, 272, 270, 208, 257, 255, 251 | |
| Transceiver 201 | Transceiver 205 | 241, 243, 245, 204, 247 | 227, 272, 270, 208, 257, 255, 251 | none |
| Transceiver 201 | Transceiver 207 | 236, 206, 284, 219, 230, 286, 249, 232, 234, 222, 288, 229, 253 | 278, 212, 240, 237, 228, 280, 227, 272, 270, 208, 257, 255, 251 | 219, 226, 221, 211 & 237, 214, 239, 215 |
| Transceiver 203 | Transceiver 201 | 249, 232, 234, 222, 288, 229, 253, 276, 278, 212, 240, 237, 228, 280, 227, 272, 270, 208, 257, 255, 251 | 236, 206, 284, 219, 230 | 219, 226, 221, 211 & 237, 214, 239, 215 |
| Transceiver 203 | Transceiver 205 | 249, 232, 234, 222, 288, 229, 253, 276, 278, 212, 240, 237, 228 | 227, 272, 270, 208, 257, 255, 251, 282, 236, 206, 284, 219, 230 | 219, 226, 221, 211 & 237, 214, 239, 215 |
| Transceiver 203 | Transceiver 207 | 249, 232, 234, 222, 288, 229, 253 | 223, 231, 233, 220, 225 | none |
| Transceiver 207 | Transceiver 201 | 278, 212, 240, 237, 228, 280, 227, 272, 270, 208, 257, 255, 251 | 236, 206, 284, 219, 230, 286, 232, 234, 222, 288, 229, 253 | 219, 226, 221, 211 & 237, 214, 239, 215 |
| Transceiver 207 | Transceiver 203 | 223, 231, 233, 220, 225 | 249, 232, 234, 222, 288, 229, 253 | none |
| Transceiver 207 | Transceiver 205 | 278, 212, 240, 237, 228 | 227, 272, 270, 208, 257, 255, 251, 282, 236, 206, 284, 219, 230, 286, 249, 232, 234, 222, 288, 229, 253 | 219, 226, 221, 211 & 237, 214, 239, 215 |
| Transceiver 205 | Transceiver 207 | 227, 272, 270, 208, 257, 255, 251, 282, 236, 206, 284, 219, 230, 286, 249, 232, 234, 222, 288, 229, 253 | 278, 212, 240, 237, 228 | 219, 226, 221, 211 & 237, 214, 239, 215 |
| Transceiver 205 | Transceiver 201 | 227, 272, 270, 208, 257, 255, 251 | 241, 243, 245, 204, 247 | none |
| Transceiver 205 | Transceiver 203 | 227, 272, 270, 208, 257, 255, 251, 282, 236, 206, 284, 219, 230 | 249, 232, 234, 222, 288, 229, 253, 276, 278, 212, 240, 237, 228 | 219, 226, 221, 211 & 237, 214, 239, 215 |
| Ethernet Port 209 | Ethernet Port 213 | 200, 217, 238, 282, 241, 243, 245, 204, 247, 280, 210, 239, 215 | 218, 235, 274, 276, 223, 231, 233, 220, 225, 286, 224, 221, 211 | none |
| Ethernet Port 213 | Ethernet Port 209 | 218, 235, 274, 276, 223, 231, 233, 220, 225, 286, 224, 221, 211 | 200, 217, 238, 282, 241, 243, 245, 204, 247, 280, 210, 239, 215 | none |
| Transceiver 201 | Ethernet Port 209 | 236, 206, 284, 219, 226, 221, 211 | 200, 217, 238 | 219, 230, 286, 249, 232, 234, 222, 288 |
| Transceiver 203 | Ethernet Port 209 | 224, 221, 211 | 200, 217, 202, 206, 284, 219, 230 | 217, 238, 282, 241, 253, 245, 204, 247, 280, 210, 239, 215 |
| Transceiver 205 | Ethernet Port 209 | 227, 272, 270, 208, 257, 255, | 200, 217, 238, 282, 241, 243, | 219, 230, 286, 249, 232, 234, 222, 288 |

TABLE 1-continued

| Packet Source | Packet Destination | Request Paths | Response Paths | Extra Path And Remarks |
|---|---|---|---|---|
| Transceiver 207 | Ethernet Port 209 | 251, 282, 236, 206, 284, 219, 226, 221, 211 223, 231, 233, 220, 225, 286, 224, 221, 211 | 245, 204, 247 200, 217, 202, 206, 284, 219, 230, 286, 249, 232, 234, 222, 288, 229, 253 | 217, 238, 282, 241, 243, 245, 204, 247, 280, 210, 239, 215 |
| Transceiver 201 | Ethernet Port 213 | 241, 243, 245, 204, 247, 280, 210, 239, 215 | 218, 235, 216, 212, 240, 237, 228, 280, 227, 272, 270, 208, 257, 255, 251 | 235, 274, 276, 223, 231, 233, 220, 225, 286, 224, 211 |
| Transceiver 203 | Ethernet Port 213 | 249, 232, 234, 222, 288, 229, 253, 276, 278, 212, 240, 237, 214, 239, 215 | 218, 235, 274, 276, 223, 231, 233, 220, 225 | 237, 228, 227, 272, 270, 208, 257 |
| Transceiver 205 | Ethernet Port 213 | 210, 239, 215 | 218, 235, 216, 212, 240, 237, 228 | 235, 274, 276, 223, 231, 233, 220, 225, 286, 224, 211 |
| Transceiver 207 | Ethernet Port 213 | 278, 212, 240, 237, 214, 239, 215 | 218, 235, 274 | 237, 228, 280, 227, 272, 270, 208, 257 |

Figure 17:
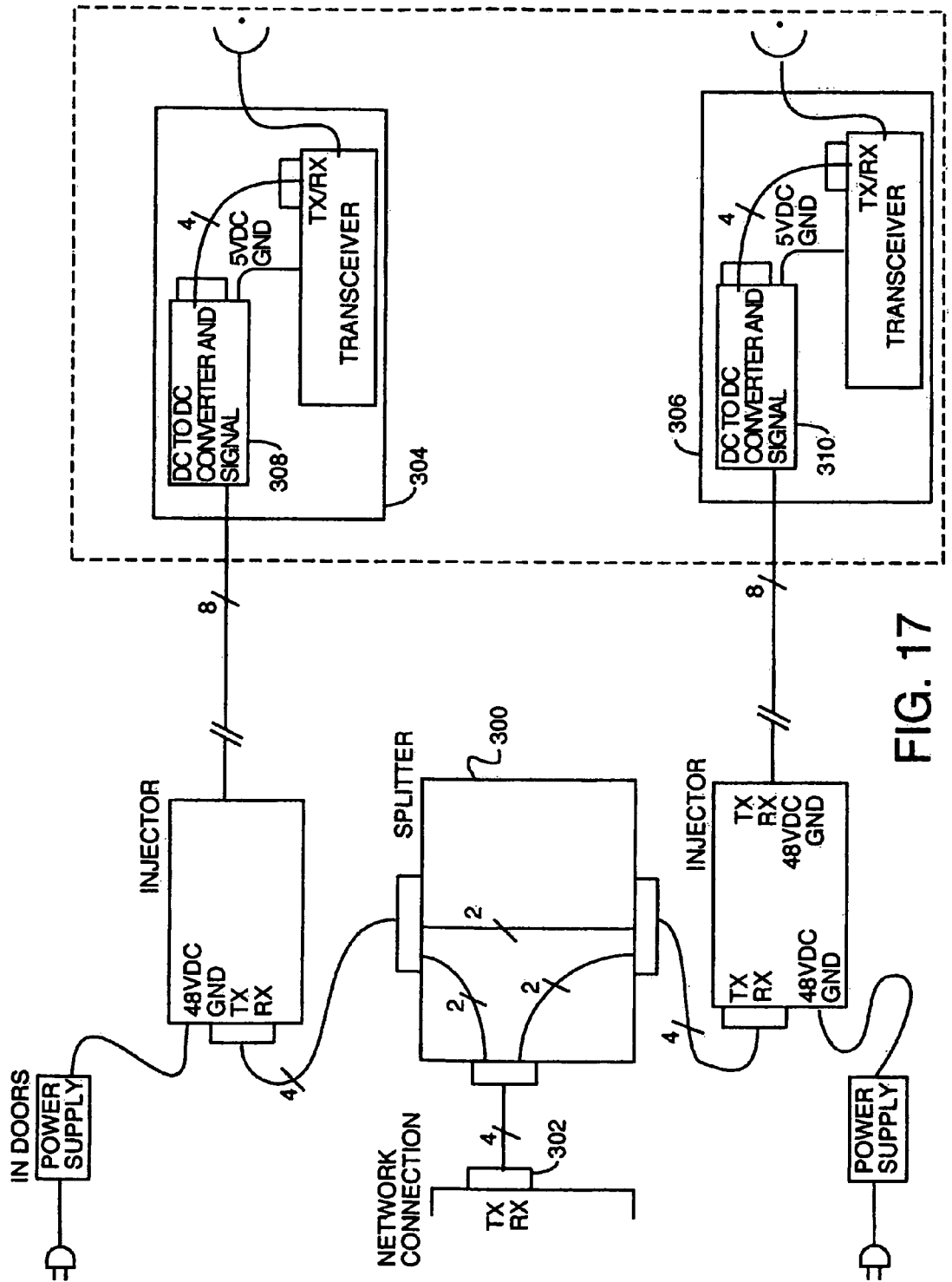
FIG. 17 is a block diagram showing another configuration for the radio bridge where the splitting of the transmit and receive data paths of the Ethernet port are done at a splitter located inside a building at the location of the Ethernet port and the radio boards are physically separated such as up on the roof of the building.

FIG. 17 is a block diagram showing another configuration for the radio bridge where the splitting of the transmit and receive data paths of the Ethernet port are done at a splitter 300 located inside a building at the location of the Ethernet port 302 and the radio boards 304 and 306 are physically separated such as up on the roof of the building. The radio boards have onboard DC-to-DC converters 308 and 310. In an alternative embodiment, the DC-to-DC converter can be external to the boards and co-located with the radio boards.

Features of various embodiments disclosed herein are as follows:

1) The size of the full duplex radio bridge is much less than a AC powered router coupled to a hardwired local area network.

2) The full duplex radio bridge appears to the other network elements to be one network device so looping cannot occur.

3. Having all the payload data going from side one to side two transmitted simultaneously with all the payload data going from side two to side 1 because of full duplex operation, causes a 50% improvement in throughput because the radio bridge does not have to switch from transmit to receive.

4. The radio bridge structure allows management packets to be transmitted to individual transceivers so that each radio bridge path going in each direction can be separately configured. This allows asymmetric network design for high speed downloads and lower speed uploads and saves spectrum because the upstream and downstream do not need to consume the same amount of bandwidth.

5. Management access is provided to each of the four transceivers in the radio bridge so each can be separately configured and managed.

Figure 14:
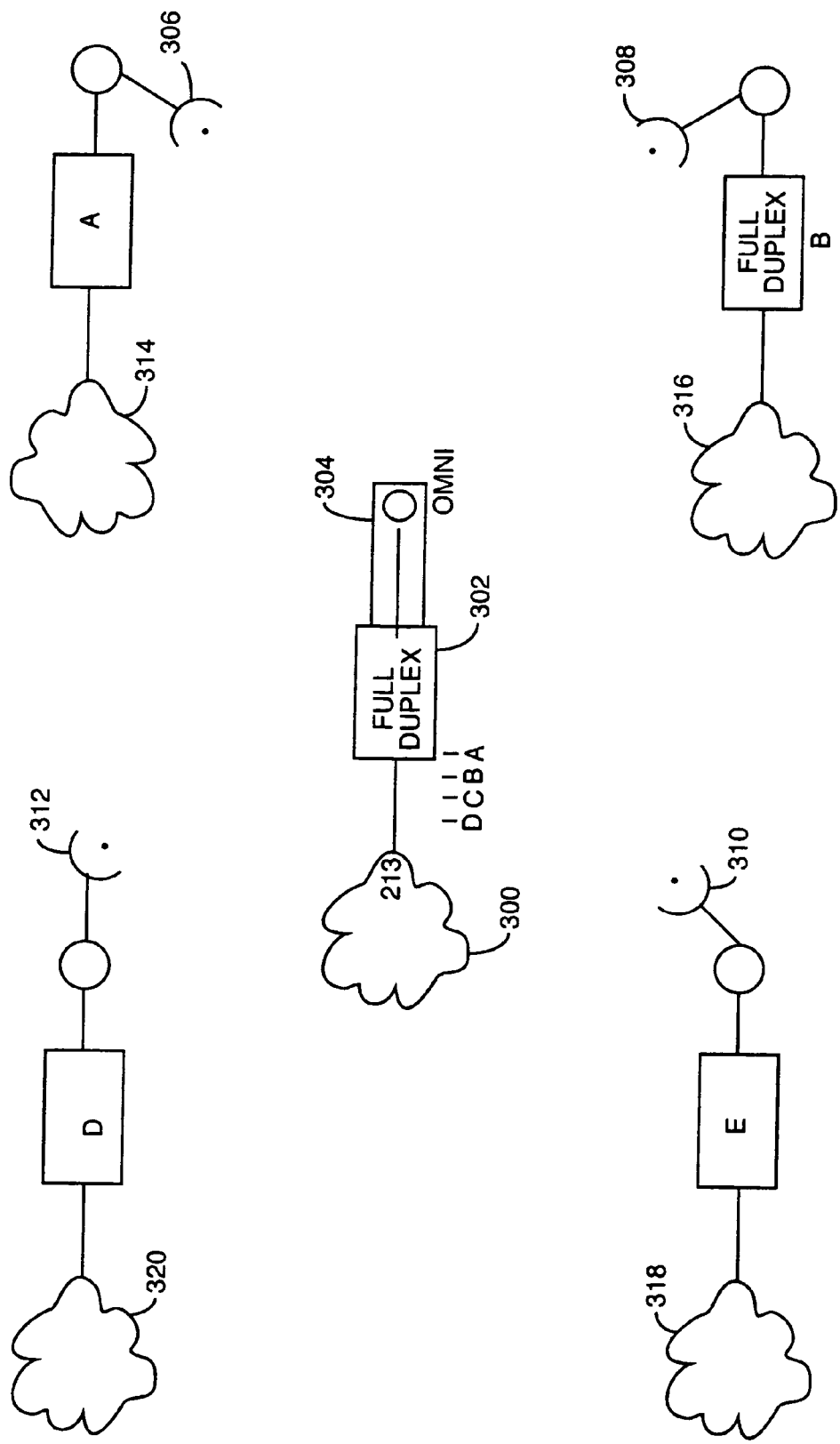
FIG. 14 is a diagram of how the full duplex radio bridge may be used in a multipoint-to-point or point-to-multipoint configuration.

6. The implementation allows the system to be completely functional in multipoint system architectures. This means that any single bridge can be configured to communicate with multiple other devices using the same two RF data paths (one upstream and one downstream). FIG. 14 is a diagram of a multipoint architecture. Ethernet network 300 is coupled to full duplex bridge 302 via a single Ethernet port 213. The full duplex bridge 302 is the equipment illustrated on side 2 of FIG. 13. The full duplex bridge 302 can be simultaneously coupled via the same two RF data paths and antenna 304 to the antennas 306, 308, 310 and 312 of full duplex bridges A, B, C and D. Each of these full duplex bridges is coupled via a single Ethernet port to Ethernet networks 314, 316, 318 and 320. Each of the devices on those networks 314, 316, 318 and 320 can exchange packets with any of the devices on network 300 via the five full duplex radio bridges of FIG. 14 as long as the antennas of the full duplex radio bridges are within line of sight communication with antenna 304. The practical limit is 124 full duplex bridges. In other words, no full bridge can talk to more than 124 full duplex bridges at any particular time.

Although the invention has been described in terms of the preferred and alternative embodiments disclosed herein, those skilled in the art will appreciate still other alternative embodiments that fall within the teachings of the invention. All such alternative embodiments are intended to be included within the scope of the claims appended hereto.

What is claimed is:

1. A management packet routing apparatus for a radio bridge comprising first and second radio frequency transceivers for modulating digital data packets onto radio frequency carriers, each having an inner loop packet network port coupled to the other transceiver by a network link, said first transceiver having an outer loop output port, and further comprising:

A) means in said first transceiver for receiving payload packets, broadcast management packets (hereafter just broadcast packets) and unicast management packets (hereafter just unicast packets) at a network input port of said first transceiver, and forwarding all said packets to a central circuit of said first transceiver;

B) means in said first transceiver for recognizing broadcast packets and unicast packets having a predetermined number as part of their destination MAC address, and routing said broadcast packets and said unicast packets having a predetermined number as part of their destination MAC address to said inner loop packet network port of said first transceiver;

C) central circuit means in said first transceiver for receiving and processing all broadcast packets and all unicast packets addressed to a destination MAC address of said first transceiver and for forwarding all packets except packets addressed to said first transceiver toward said outer loop output port.

2. The apparatus of claim 1 further comprising:
D) means in said first transceiver for recovering encapsulated broadcast and unicast management packets transmitted on a radio frequency carrier and received at an inner loop data path input port;
E) means in said first transceiver for filtering said recovered encapsulated broadcast and unicast management packets and determining for each said packet if the source MAC address indicates the packet was generated by said first transceiver, and, if so, dropping the packet, and, if not, forwarding said packet:
F) means in said first transceiver for receiving packets forwarded by the process of step E, and determining if said packet is tagged meaning it has data in its header which was added to indicate said packet came from a packet network and was routed onto said inner loop data path, and, if said packet is tagged and its source MAC address indicates it is not addressed to said first transceiver, dropping said packet, and, if said packet is not tagged and its destination MAC address indicates it is addressed to said first transceiver, forwarding said packet to said central circuit.

3. The apparatus of claim 1 further comprising an outer loop data path coupling said central circuit of said first transceiver to said outer loop output port, and further comprising:
G) means in said first transceiver for filtering packets output by said central circuit onto said outer loop data path so as to identify packets which have been tagged meaning packets which have had data in their headers which has been added to indicate said packets came from a packet network, and for dropping said packets.

4. The apparatus of claim 1 further comprises a data path coupling said central circuit to said inner loop packet network port, and further comprising means for receiving response packets at said central circuit and consulting a routing table maintained by said central circuit and determining if said response packet is addressed to a device coupled to said inner loop data path other than said central circuit itself or to a device coupled to said outer loop output, and, if said response packet is addressed to a device coupled to said inner loop data path other than said central circuit itself, routing said response packet onto said data path coupling said central circuit to said inner loop data port, and, if said response packet is addressed to a device coupled to said outer loop output, routing said response packet toward said outer loop output.

* * * * *